United States Patent [19]

Doi et al.

[11] Patent Number: 5,043,990
[45] Date of Patent: Aug. 27, 1991

[54] SEMICONDUCTOR INTEGRATED CIRCUIT DEVICE

[75] Inventors: Toshio Doi, Kokubunji; Takehisa Hayashi, Kodaira; Kenichi Ishibashi, Kokubunji, all of Japan

[73] Assignee: Hitachi, Ltd., Tokyo, Japan

[21] Appl. No.: 279,034

[22] Filed: Dec. 2, 1988

[30] Foreign Application Priority Data

Dec. 4, 1987 [JP] Japan .............................. 62-305582
Jan. 14, 1988 [JP] Japan ................................ 63-4927

[51] Int. Cl.⁵ ............................................ G06F 11/10
[52] U.S. Cl. .................... 371/68.1; 371/67.1; 371/3; 371/68.3
[58] Field of Search ................ 371/68.1, 68.2, 68.3, 371/67.1, 61, 3, 37.1, 40.1

[56] References Cited

U.S. PATENT DOCUMENTS

| | | | |
|---|---|---|---|
| 4,506,385 | 3/1985 | Fedde | 371/3 |
| 4,531,213 | 7/1985 | Scheuneman | 371/3 |
| 4,561,095 | 12/1985 | Khan | 371/3 |
| 4,736,376 | 4/1988 | Stiffer | 371/3 |
| 4,740,968 | 4/1988 | Aichelmann | 371/3 |
| 4,763,328 | 8/1988 | Shimoda | 371/3 |
| 4,792,955 | 12/1988 | Johnson | 371/68.1 |
| 4,878,220 | 10/1989 | Hashimoto | 371/3 |

FOREIGN PATENT DOCUMENTS 2262002 12/1988 Fed. Rep. of Germany .
62-98827 8/1987 Japan .

OTHER PUBLICATIONS

Howe, Jr., IBM Technical Disclosure Bulletin, vol. 13, No. 3, Aug. 1970.
Hanna, IBM Technical Disclosure Bulletin, vol. 27, No. 1B, Jun. 1984.
ISSCC Digest of Technical Papers, pp. 54-55, 2/82, IEEE, "Testing and Design Automation", Horiguchi.
Keikichi, Tamaru, "Ronikairo No Kiso", P. 220.
F. F. Sellers, Jr. et al., "Error Detecting Logic for Digital Computers", Chapter 7, McGraw-Hill Book Company, 1968, pp. 103-128.

*Primary Examiner*—Michael R. Fleming
*Attorney, Agent, or Firm*—Antonelli, Terry, Stout & Kraus

[57] ABSTRACT

A semiconductor integrated circuit device is provided which includes a logic circuit utilizing an error detection code. The device has a first circuit train including a series connection of plural stages of operation circuits for receiving input data, performing predetermined operations while the input data propagates through the operation circuits and providing output data; a second circuit train including a series connection of plural stages of error detection code correction circuits for receiving error detection code input corresponding to the input data, applying corrections to the error detection code in correspondence to the operations in the operation circuits in the first circuit train, and outputting an error detection code corresponding to the output data; and at least one error detection circuit for performing a comparison and check of the output of the operation circuit in the first circuit train and the output of a corresponding error detection code correction circuit in the second circuit train. Also, the semiconductor integrated circuit device of this invention comprises a logic circuit incorporating therein an error detection function by doubling the circuits which comprise a logic circuit using the error detection code. doubled operation circuits having the same function and inputted with the same signal, and a comparison circuit for mutually comparing the outputs of the doubled operation circuits.

27 Claims, 19 Drawing Sheets

FIG. 7

| S3 | S2 | S1 | S0 | Gn | Pn | HAn OPERATION RESULT | HAn PARITY |
|---|---|---|---|---|---|---|---|
| L | L | L | L | AnDn | An+Dn | An ⊕ Dn | PA ⊕ PD |
| L | L | L | H | An $\overline{Bn}$ | An+$\overline{Bn}$ | $\overline{An \oplus Bn}$ | PA ⊕ PB |
| L | L | H | L | $\overline{An}$ Bn | $\overline{An}$+Bn | An ⊕ Bn | PA ⊕ PB |
| L | L | H | H | L | $\overline{Bn}$ | $\overline{Bn}$ | PB |
| L | H | L | L | An Bn | An+Bn | An ⊕ Bn | PA ⊕ PB |
| L | H | L | H | An $\overline{Bn}$ | An+$\overline{Bn}$ | $\overline{An \oplus Bn}$ | PA ⊕ PB |
| L | H | H | L | $\overline{An}$ Bn | $\overline{An}$+ Bn | $\overline{An \oplus Bn}$ | PA ⊕ PB |
| L | H | H | H | L | $\overline{Bn}$ | $\overline{Bn}$ | PB |
| H | L | L | L | AnBn | An+Bn | An ⊕ Bn | PA ⊕ PB |
| H | L | L | H | An$\overline{Bn}$ | An+$\overline{Bn}$ | $\overline{An \oplus Bn}$ | PA ⊕ PB |
| H | L | H | L | An | $\overline{Bn}$ | An+$\overline{Bn}$ | PA ⊕ PB ⊕ PA·B |
| H | L | H | H | An | H | $\overline{An}$ | PA |
| H | H | L | L | L | Bn | Bn | PB |
| H | H | L | H | L | $\overline{Bn}$ | $\overline{Bn}$ | PB |
| H | H | H | L | L | $\overline{An}$+ $\overline{Bn}$ | $\overline{An}$+ $\overline{Bn}$ | PA⊕PB⊕P$\overline{A}$·$\overline{B}$ |
| H | H | H | H | L | H | H | L |

PA: PARITY OF An  PB: PARITY OF Bn
PD: PARITY OF Dn   PA·B: PARITY OF An·Bn
P$\overline{A}$·$\overline{B}$: PARITY OF $\overline{An}$·$\overline{Bn}$

SEMICONDUCTOR INTEGRATED CIRCUIT DEVICE

BACKGROUND OF THE INVENTION

This invention relates to a semiconductor integrated circuit device including a logic circuit which requires high reliability, and more particularly to a semiconductor integrated circuit device including a logic circuit which has improved the integration density and/or operation speed without sacrificing the reliability.

For improving the reliability of the logic circuit, ISSCC DIGEST OF TECHNICAL PAPERS, pp. 54-55; Feb., 1982 (IEEE) proposed a method in which a parity bit is added to each data to enable detection of the data error, while the logic circuit is doubled and their outputs are compared to detect the error in the logic operation.

FIG. 1 illustrates an example of the error detection in this prior art. The arithmetic logic unit (ALU) is doubled to detect the error. ALU1 and ALU2 have logically completely the same function. Data A and B are inputted to both the ALU1 and the ALU2. The operation result of the ALU1 is outputted at an output terminal F. At the same time, the operation results of the ALU1 and ALU2 are supplied to a comparison circuit CMP to check the existence or absence of the error of the operation actions. The comparison circuit CMP generates the error detection signal at a terminal E. Regarding the error detection of the input data, the parity bits $P_A$ and $P_B$ associated with the data A and B are inputted and checked in parity check circuits PCA and PCB, the result of which are outputted at output terminals $E_A$ and $E_B$. Further, a parity generation circuit PG calculates a parity output based on the ALU output and supplies the parity output at an output terminal $P_F$.

FIG. 2 illustrates an example in which the above-mentioned prior art is applied to an operation unit comprising ALU's, registers, pre-shifters, etc. The construction of an ALU unit 16 is practically the same as that of FIG. 1. In the figure, reference symbols DL1601 and DL1602 denote data latches, PL16 a parity latch, R1501 and R1502 registers, and PS1501 and $P_A$1502 pre-shifters. In this example, the parity check of the register outputs is carried out in parity check circuits PCA and PCB. The results of the parity check are supplied from respective terminals $E_A$ and $E_B$. The operation results of two sets of the doubled pre-shifters PS1501 and PS1502 (shift circuits SH1501 and SH1502 and shift circuits SH1503 and SH1504) are respectively compared and checked in comparison circuits CMP1601 and CMP1602. The results of the comparison and check are outputted from terminals E1601 and E1602.

By employing such construction as described above, it is made possible (1) to detect the error of the input data using the parity bit, (2) to detect the error of the operation result by the doubled structure of the ALU and the pre-shifter, and (3) to add a parity bit to the operation results of the ALU.

FIG. 3 illustrates an example of a combination of a comparison and check circuit for the operation results of doubled circuits and a diagnosis circuit for this comparison and check circuit. In the figure, reference symbols 1301 and 1302 denote doubled operation circuits having the same function, EOR13 an exclusive OR (EOR) circuit for comparison and check, 1303 a diagnosis circuit for the EOR circuit, and AND1301 and AND1302 ADD circuits. The doubled operation circuits 1301 and 1302 generate the same operation results as far as they work normally. The comparison and check circuit EOR13 cannot discriminate whether the operation circuits 1301 and 1302 work normally or the outputs thereof are accidentally fixed at normal values. Therefore, the output of one operation circuit is forced to take a different value from the output of the other operation circuit by a diagnosis circuit 1303 formed, in this example, of the AND circuits AND1301 and AND1302, and the comparison and check circuit EOR13 performs diagnosis. Thus, a logic circuit 1300 including an error detection circuit is obtained. In the figure, reference symbols $T_2$ and $T_3$ denote diagnosing control signals which are set at the high level in the normal operation. Therefore, signals OUT1301 and OUT1302 are directly inputted to the comparison and check circuit EOR31. When both the logic operation circuits 1301 and 1302 work normally, the signals OUT1301 and OUT1302 take the same value. Therefore, the output ER13 of the comparison and check circuit EOR13 always takes the low level. Then, discrimination cannot be made between the normal operation of the comparison and check circuit EOR13 and the case in which the output in pinned at the low level by some malfunction. For enabling discrimination of these two in the diagnosis of the logic circuit, such inputs are applied to A11-D11 that for example when the control signal $T_2$ is set to the low level the output of the AND circuit AND1301 becomes the low level and the signal OUT1301 at this moment becomes of the high level. When the comparison and check circuit EOR13 operates normally, the output ER13 becomes the high level. When there is a malfunction, the output ER13 becomes the low level. In this way, diagnosis of the comparison and check circuit EOR13 can be made by bringing one of the diagnosis control signal $T_2$ or $T_3$ to the low level.

The logic circuits having error detection ability as explained in connection with FIGS. 1 to 3 have following problems.

First, regarding the delay time of the ALU unit, since the parity generation operation is performed after the completion of the operation of the ALU unit using the result of the operation, the delay time becomes the sum of the two operations and hence increases compared to the case when the parity bit is not added. This increment amounts to e.g. about 20% of the total delay time in the 32 bits ALU and forms a factor of disturbing the improvement in the operation speed. Also, by providing a diagnosing circuit for the comparison and check circuit, the delay time of the error detection signal increases.

Next, regarding the lay-out area, each one additional circuit is required for the check of the result in addition to the one for operation with respect to the ALU which has a large logic scale and requires a wide area and with respect to the pre-shifter which has many wiring lines and requires a wide area. Further, since a parity check circuit for the register output, a comparison and check circuit for the ALU output and the pre-shifter output, and a diagnosing circuit for the comparison and check circuit are required, the occupation area should increase.

Further, for improving the operation speed in the prior art, there are such ways as reduction of the delay times of the respective stages of the circuit by the improvement of the driving ability of the active elements such as transistor constituting the logic circuit, a reduction of the number of circuit stages in the critical path by the improvement in the degree of logic parallelism. The former requires to increase the area of the active elements and the latter requires to increase the number of circuits. Either of them leads to an increase in the lay-out area. Therefore, when improvement in the operation speed is attempted in an operation unit utilizing the prior art which requires a large lay-out area for the error detection through doubled circuit construction, there is a possibility that the high integration of the LSI should remarkably be disturbed.

SUMMARY OF THE INVENTION

An object of the present invention is to provide a semiconductor integrated circuit device including a logic circuit having an error detection function, which has improved the integration density and/or the high speed operation, without sacrificing the reliability.

A semiconductor integrated circuit device according to this invention provides a logic circuit utilizing error detection codes which comprises a first circuit train (data operation unit) in which input data are inputted to an operation circuit which is formed by serially connecting a plurality of stages, predetermined operations are carried out while the input data propagates through the operation circuit to provide output data, a second circuit train (error detection code correction unit) including a series connection of error detection code correction circuits for performing corrections to the error detection code corresponding to the operation in the respective operation circuits in the first circuit train, by the input of error detection codes corresponding to said input data, and at least one error detection circuit for performing check between the output of the operation circuit in the first circuit train and a corresponding output of the error detection code correction circuit in said second circuit train.

Said first and second circuit trains perform the operation of the data and the generation of the error detection code, in parallel. An error detection code output corresponding to an operation result is obtained substantially at the same time as the termination of the data operation. Thus, the operation time can be reduced to substantially the same order a the case of not generating any error detection code. The error detection circuit performs error detection (parity check) in parallel with data operation, based on the output of the operation circuit and the corresponding output of the error detection code correction circuit, thereby detecting the error in the operation. Without doubling the circuit, similar reliability can be obtained. Further, since the increment in the area by the error detection code correction circuit and the error detection circuit can be reduced to be smaller than the area of one operation circuit, the layout area can be made of the comparable order or less compared to the case of doubling the operation circuit.

The above-mentioned construction of the logic circuit utilizing the error detection code is fitted to be applied to the ALU unit having a large operation scale. Further, it is also possible to apply the above-mentioned construction of the logic circuit utilizing the error detection code to not only the ALU unit but to the whole operation unit including the ALU unit.

A semiconductor integrated circuit device according to this invention comprises a plurality of operation circuits, each including a first circuit for performing a predetermined operation with respect to the input data and generating the output data, and a second circuit for performing a predetermined operation with respect to the error detection code input corresponding to the above-mentioned input data and outputting the error detection code corresponding to the above-mentioned output data, and a logic circuit utilizing the error detection code which forms a data path by a first circuit train connecting the above-mentioned first circuits in the respective operation circuits and forms an error detection code path by a second circuit train connecting the above-mentioned second circuits in the operation circuits mutually connected by the data path, and includes at least one error detection circuit for performing check between the output data of the above-mentioned first circuit and the error detection code of the output of the above-mentioned second circuit in the same operation circuit. Namely, the error detection code output of the second train is arranged to follow the data output of the first circuit train. By so arranging the error detection code output of the second circuit train to follow the data output of the first circuit train, the number of error detection circuits of the operation results can be reduced and the reduction of the lay-out area can further be made.

Further, a semiconductor integrated circuit device according to this invention comprises an above-mentioned logic circuit utilizing the error detection code, and a logic circuit incorporating therein the error detection function by doubling the circuit, including doubled operation circuits having the same function and receiving the same signal and a comparator circuit for mutually comparing the outputs of the doubled operation circuits. Namely, two kinds of circuits, the logic circuit utilizing the error detection code and the logic circuit incorporating therein the error detection function by doubling the circuit, are selectively used depending on the characteristic of the circuit. By the co-existence of the two kinds of the logic circuits, high operation speed and high integration are simultaneously attained as a whole. This construction is fitted to be applied to the ALU of carry-look-ahead system. Since the ALU unit has a large circuit scale, the construction of the logic circuit utilizing the error detection code is used. The carry-look-ahead generator unit has a relatively small circuit scale. Hence, the construction of the error detection function built-in logic circuit by the doubled circuit structure is used. Further, the control circuit unit for generating the operation control signals also employs a structure of performing the error detection by doubling the control signal generator.

Further, for the error detection function built-in logic circuit by doubling the circuit, the diagnosis function of the error detection circuit is afforded to the doubled operation circuit itself by dividedly supplying clock signals into the supply system of the clock signal to the switch circuits for deriving the outputs of the logic circuit network to the external and the supply system of the clock signal to other switch circuits in the operation circuit. Therefore, a semiconductor integrated circuit device according to this invention comprises a logic circuit incorporating a diagnosis function of the error detection circuit therein, which includes doubled operation circuits, and a comparator for comparing the outputs of the doubled operation circuits to each other, wherein the supply system of the clock signal to each of the doubled operation circuits is divided into a supply system of the clock signal to the switch circuits for deriving the output signals of the logic circuit network in the operation circuit, and a supply system of the clock signal to other switch circuits in the operation circuit. Namely, by dividing the clock supply system to each of the doubled operation circuits into two systems and supplying the clock signals through the divided systems, the same clock signals are supplied to the two systems in the normal operation, while different clock signals are supplied to the two supply systems for one of the doubled operation circuits in the mulfunction diagnosis time whereby the switch circuits for deriving the output of the logic circuits of this operation circuit to the external are turned non-conductive and thereby one of the output levels of the doubled operation circuits inputted to the comparator circuit can be fixed at either of the high level or the low level. Thus, it is possible for the outputs of the doubled operation circuits to be mutually different signals. Namely, the clock signals are changed between the normal time and the diagnosis time thereby affording the operation circuit itself the generation function of the signal for diagnosing the comparator circuit. Thereby, the diagnosis circuit can be dispensed with and the reductions in the number of circuits and the area of lay-out and the reduction in the delay time of the error detection signal can be made possible. This construction is fitted to be applied to a dynamic type logic circuit of the domino type. Especially, it is fitted to be applied to the carry-look-ahead generator unit in the ALU of the carry-look-ahead system. Namely, as described above, a construction of the logic circuit utilizing the error detection code is used for the ALU unit, the construction of the logic circuit incorporating therein the diagnosis function of the comparator circuit for the carry-look-ahead generator unit, and the conventional construction of the logic circuit incorporating the error detection function by the doubled structure therein is used for the control circuit unit, thereby providing co-existence of the logic circuits having three kinds of the error detection ability.

BRIEF DESCRIPTION OF THE DRAWINGS

FIG. 7 is a chart for illustrating the function of the second stage circuit of the data operation unit of the embodiment of FIG. 5.

DESCRIPTION OF THE PREFERRED EMBODIMENTS

Figure 4:
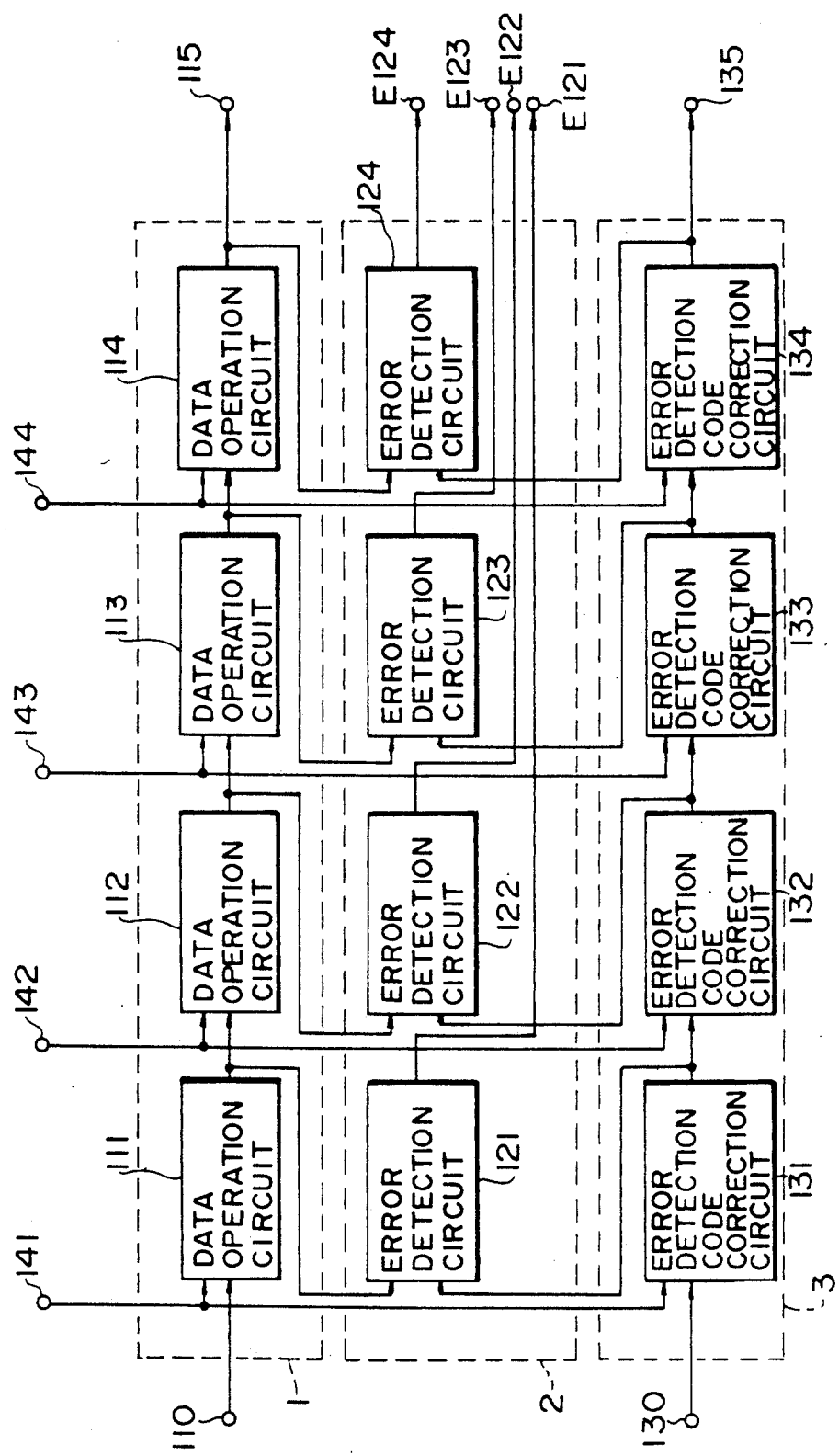
FIG. 4 is a block diagram illustrating an embodiment of this invention and showing a logic circuit utilizing the error detection code.

FIG. 4 is a block diagram of an embodiment of this invention. In FIG. 4, reference numeral 1 denotes a data operation unit, 2 an error detection unit, 3 an error detection code correction unit corresponding to the second circuit train, 110 a data input terminal, 111 to 114 data operation circuits, 115 a data output terminal, 121 to 124 error detection circuits, 130 an error detection code input terminal, 131 to 134 error detection code correction circuits, 135 an error detection code output terminal, 141 to 144 control signal input terminals, and E121 to E124 error detection signal output terminals. In this embodiment, with respect to the input data signal inputted through the data input terminal 110, predetermined operations are done according to the signals inputted through the control signal input terminals 141 to 144 while the input data signal propagates through the serially connected operation circuits 111 to 114 which constitute the data operation unit 1. The result of operation is outputted through the output terminal 115. In the error detection code correction unit 3, the error detection code correction circuits 131 to 134 are provided in correspondence to the operation circuits 111 to 114 in the first circuit train, and the control signals inputted through the input terminals 141 to 144 are also inputted. Corrections corresponding to the data operations are done on the error detection code inputted through the error detection code input terminal 130, in the circuits 131 to 134. Further, in the error detection unit 2, the error detection circuits 121 to 124 corresponding to the circuits 111 to 114 and 131 to 134 are provided. The outputs of the respective stages of the data operation unit 1 and the error detection code correction unit 3 are inputted to the corresponding stages of the error detection circuit. The results of error detection obtained from the operation data and the error detection code of the respective stages of these circuits are outputted respectively to the output terminals E121 to E124. For example, when the parity is used as the error detection code, the parity bit of the input data is inputted to the error detection code input terminal 130 and corrections are made in the error detection code correction circuits 131 to 134 so that the parity determined in accordance with the operations in the respective stages of the operation circuits 111 to 114 is provided as the output, while the parities corrected in the respective error detection code correction circuits 131 to 134 and the parities of the respective operation results of the operation circuits 111 to 114 are compared by the parity check and the results thereof are outputted through output terminals E121 to E124. By this arrangement, it becomes possible to detect 1 bit errors of the outputs of the operation circuits similar to the double arrangement of the prior art. Also, in this embodiment, data and the corresponding parity bits are inputted and the operations on the former and the corrections on the latter are performed in parallel, as described above. As the result, the parity output is obtained substantially at the same time as the data output, thereby reducing the operation time. Further, because the number of bits of the parity bits is less than the number of bits of the data (usually one parity bit is added to 8 data bits), the scale of the circuits required to be added for applying the present embodiment, such as the error detection code correction unit is smaller than the data operation unit 1, allowing reduction of the lay-out area compared to the case of doubling the operation unit. Therefore, improvements in both the high speed processing and the high integration density can simultaneously be achieved. In the prior art of FIG. 1, the error detection of the input data was done in the parity check circuits PCA and PCB. The error detection circuit 121 of the first stage achieves this function too, in the present embodiment.

Figure 5:
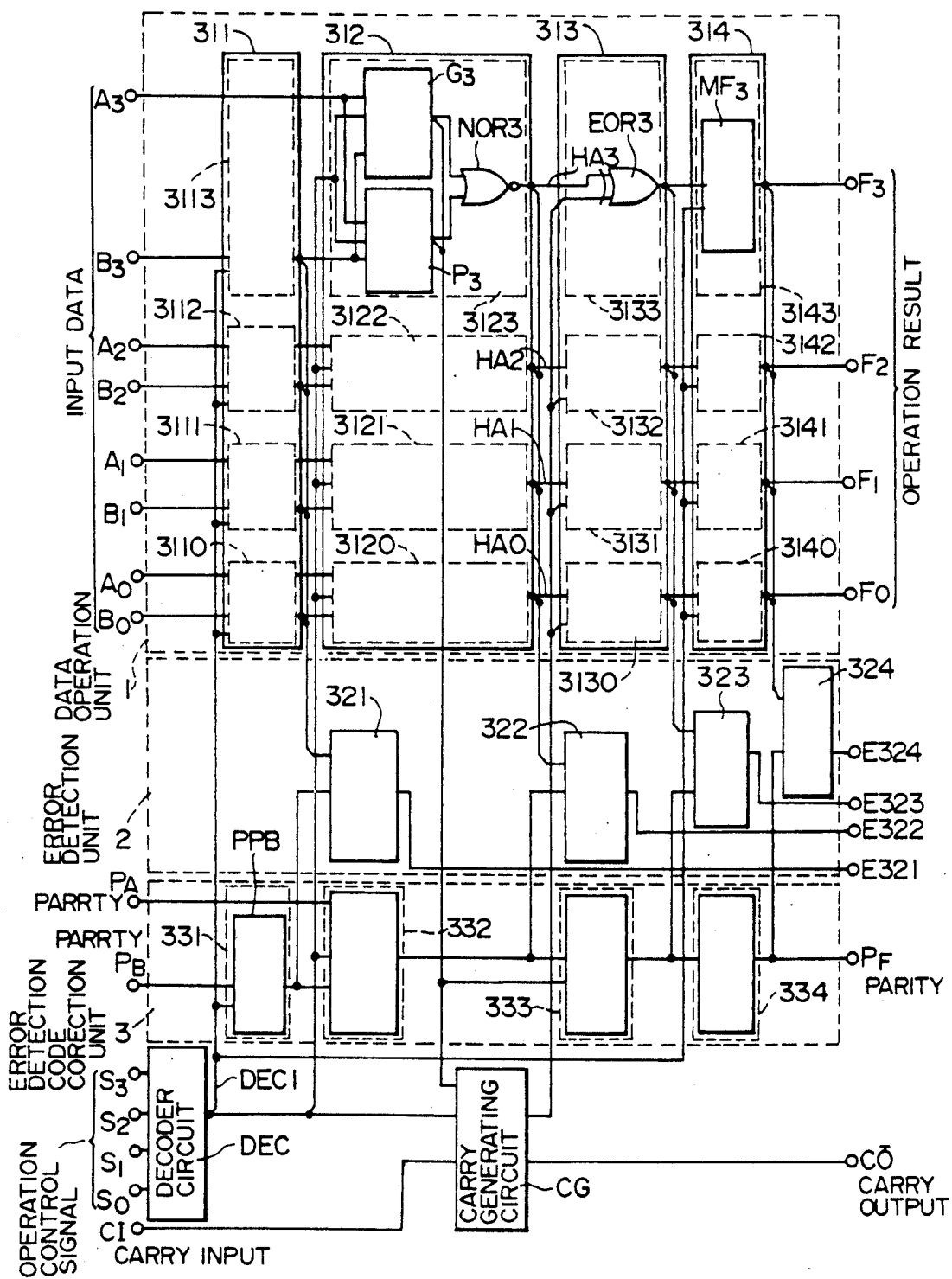
FIG. 5 is a block diagram illustrating an embodiment of the present invention applied to the ALU.

FIG. 5 is a block diagram showing another embodiment in which the inventive feature of this invention is applied to the ALU. In FIG. 5, reference symbols $A_0$ to $A_3$ denote A input data, $B_0$ to $B_3$ B input data, CI a carry input, $S_0$ to $S_3$ operation control signal, $F_0$ to $F_3$ operation results, Co a carry output, $P_A$ the parity of A input data, $P_B$ the parity of B input data, 3110 to 3113 circuits constituting the first stage operation circuit 311 of the data operation unit 1, 3120 to 3123 circuits constituting the second stage operation circuit 312 of the data operation unit 1, 3130 to 3133 circuits constituting the third stage circuit 313 of the data operation unit 1, 3140 to 3143 circuits constituting the fourth stage operation circuit 314 of the data operation unit 1, DEC a decoder circuit, and CG a carry generating circuit. Now the operation of this embodiment will be described.

In FIG. 5, with respect to A input data $A_0$ to $A_3$, B input data $B_0$ to $B_3$ and a carry input CI, arithmetic operation or logic operation selected by the operation control signals $S_0$ to $S_3$ are performed to provide the operation results $F_0$ to $F_3$ and a carry output CO. Further, in this embodiment, the parity is used as the error detection code. The parity $P_A$ of A input data and the parity $P_B$ of B input data are inputted to the ALU together with the data, and the parity of the operation result is outputted at $P_F$. The first stage circuit 311 of the data operation unit 1 is a stage corresponding to a binary coded decimal (BCD) operation and adds 6 to only the B input data when performing the BCD operation. In correspondence to this operation, the first stage circuit 331 of the error detection code correction unit 3 (hereinafter, referred to simply as the correction unit) corrects the parity $P_B$. The outputs of the two are inputted to the error detection circuit 321 to perform the parity check thereon, thereby detecting errors in the first stage and errors in the input data. Next, in the second stage operation circuit 312 of the data operation unit 1, arithmetic operation or logic operation selected by operation control signals $S_0$ to $S_3$ is performed. In the case of arithmetic operation, this stage works as a half adder, and the carry action is done in the next stage. The circuit 3123 comprises a carry generation signal generating circuit $G_3$, a carry propagation signal generating circuit $P_3$, and a NOR circuit $NOR_3$. The circuits 3120 to 3122 each has the same structure as the circuit 3123. Reference symbols $HA_0$ to $HA_3$ denote half adder outputs. The second stage circuit 332 of the correction unit 3 performs parity correction using the parity $P_A$ and the output $P_0$ of the first stage. These outputs are inputted to the error detection circuit 322 to perform the parity check thereat. In the similar manner, the third stage performs the carry action of the arithmetic operation, and the fourth stage performs $-6$ operation in the case of the BCD operation. Also, the parity correction and the parity check are performed. The circuit 3133 comprises an exclusive OR circuit $EOR_3$, and the circuit 143 comprises a $-6$ circuit $MF_3$. The circuits 3130 to 3132 each has the same structure as the circuit 3133 and each of the circuits 3140 to 3142 has the same structure as the circuit 3143.

In this embodiment, since the parity output is obtained substantially at the same time as the data output similar to the case of FIG. 4, the operation time is reduced. Further in this embodiment, while the data operation unit requires 4 circuits for each stage, either of the error detection unit and the correction unit may be constructed by one circuit. Therefore, the number of circuits can be reduced compared to the case of doubling the data operation unit 1, and also the lay-out area can be reduced. In this embodiment, one bit parity bit is given to four bits input data. It is general to add one parity bit to eight data bits. Taking such arrangement, the reduction of the lay-out area by this invention becomes more significant. It may be noted that the present invention can be similarly achieved in such ALUs which have different constructions and functions (for example, ALUs having no BCD operation function).

Figure 6:
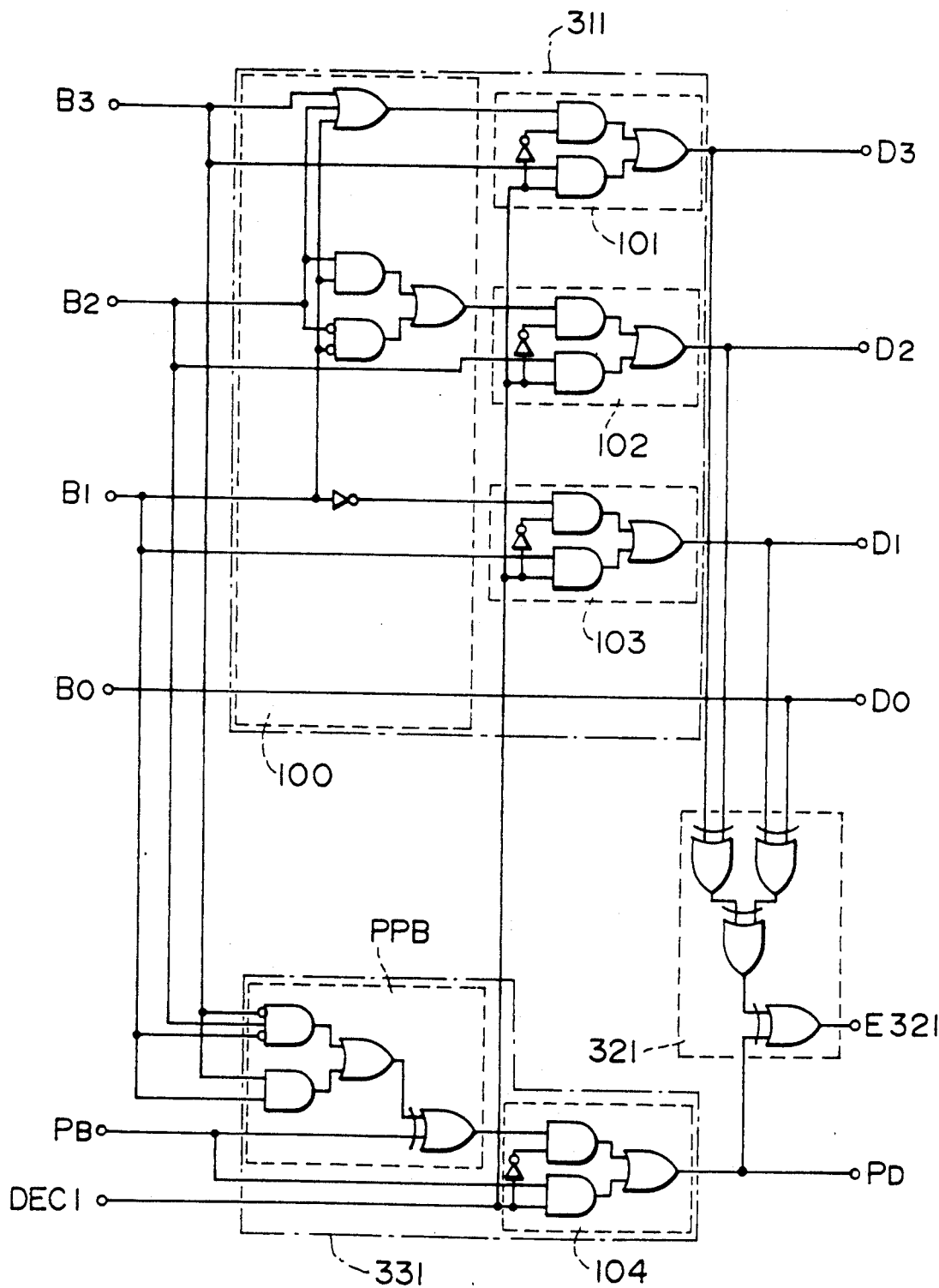
FIG. 6 is a circuit diagram of the first stage of the embodiment of FIG. 5.

Next, FIG. 6 shows each one example of the first stage circuit 311, 321, 331 of the data operation unit 1, the correction unit 3 and the error detection unit 2. In the figure, reference numeral 100 denotes a $+6$ circuit, PPB a $+6$ correction circuit, 101 to 104 output selection circuits, $B_0$ tp $B_3$ B input data, $D_0$ to $D_3$ output data of the data operation circuit 311, $P_D$ the output parity of the correction circuit 331, and DEC1 and operation control signal.

The operation citcuit 100 performs the operation of adding 6 to the B input data $B_0$ to $B_3$, while the selection circuit 101 to 104, based on the control signal DEC1, output the value after adding 6 to $D_0$ to $D_3$ when the control signal DEC1 is "0", and the value without addition to $D_0$ to $D_3$ when the control signal DEC1 is "1". It also supplies the parity bit corresponding to the output to $P_D$.

The logic of the output data $D_0$ to $D_3$ after addition of 6 can be represented as follows.

$$D_3 = B_1 + B_2 + B_3$$

$$D_2 = B_1 \cdot B_2 + \overline{B_1} \cdot \overline{B_2}$$

$$D_1 = \overline{B_1}$$

$$D_0 = B_0$$

As the result of the above operation, the case which inverts the parity is the case of $$B_1 \cdot B_3 + B_1 \cdot B_2 \cdot B_3 = 1$$

and this correction is done in the correction circuit PPB. As the result, when there is no error in the operation, the parity of the output data $D_0$ to $D_3$ becomes equal to the parity $P_D$ of the output of the correction circuit PPB. By checking these in the error detection circuit 321, one bit error can be detected.

Next, FIG. 7 shows an example of the function of the second stage circuit 312 of the data operation unit 1 of FIG. 5. This circuit performs the predetermined operation illustrated in the figure in accordance with the operation control signals $S_0$ to $S_3$ In the figure, reference symbol Gn (n=0–3) represents the output of the carry generation signal generating circuit $G_0$ to $G_3$ in the circuit 3120 to 3123 (in FIG. 5, however, the carry generation signal generating circuits $G_0$ to $G_2$ in the circuits 3120 to 3122 are not shown). and Pn (n=0–3) the output of the carry propagation signal generating circuit $P_0$ to $P_3$ in the circuits 3120 to 3123 (in FIG. 5, however, the circuits $P_0$ to $P_2$ in the circuits 3120 to 3122 are not shown). Also, symbol HAn (n=0–3) denotes the output of the circuit 3120 to 3122. As shown in this figure, the parity of the output HAn can be obtained from the parities $P_A$ (the parity of An), $P_B$ (the parity of Bn), $P_D$ (the parity of Dn), $P_{AB}$ (the parity of An·Bn) and $P_{\overline{AB}}$ (the parity of $\overline{An \cdot Bn}$).

Figure 8:
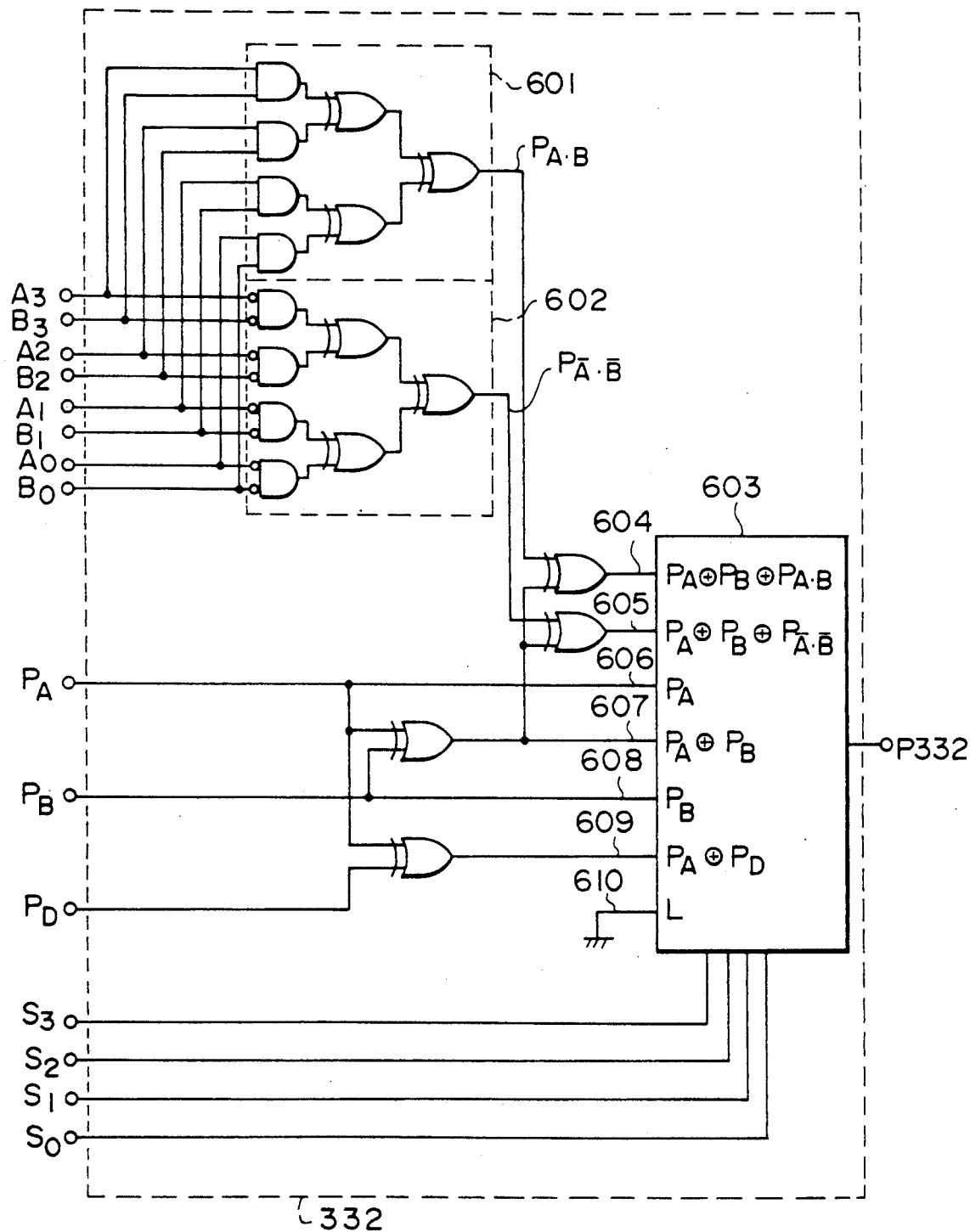
FIG. 8 is a circuit diagram showing an example of the second stage circuit of the error detection code correction unit in the embodiment of FIG. 5.

FIG. 8 shows an example of the error detection code correction circuit 332 corresponding to the operation circuit 312 having the function shown in FIG. 7. The parity of the operation circuit output can be obtained from the parities $P_A$, $P_B$ and $P_D$ and the data $A_0$–$A_3$ and $B_0$–$B_3$ in accordance with the operation control signals $S_0$ to $S_3$. In FIG. 8, reference numeral 601 denotes a $P_{AB}$ generation circuit, 602 a $P_{\overline{AB}}$ a generation circuit, 603 a parity selection circuit, 604 to 610 input terminals of the parity selection circuit 603. There are inputted $P_A \oplus P_B \oplus P_{AB}$ to the input terminal 604, $P_A \oplus P_B \oplus P_{\overline{AB}}$ to the input terminal 605, $P_A$ to the input terminal 606. $P_A \oplus P_B$ to the input terminal 607, $P_B$ to the input terminal 608, $P_A \oplus P_D$ to the input terminal 609 and 0 to the input terminal 610. The parity selection circuit 603 selects the inputs in accordance with the control signals $S_0$ to $S_3$ and supplies an output to P332.

Figure 1:
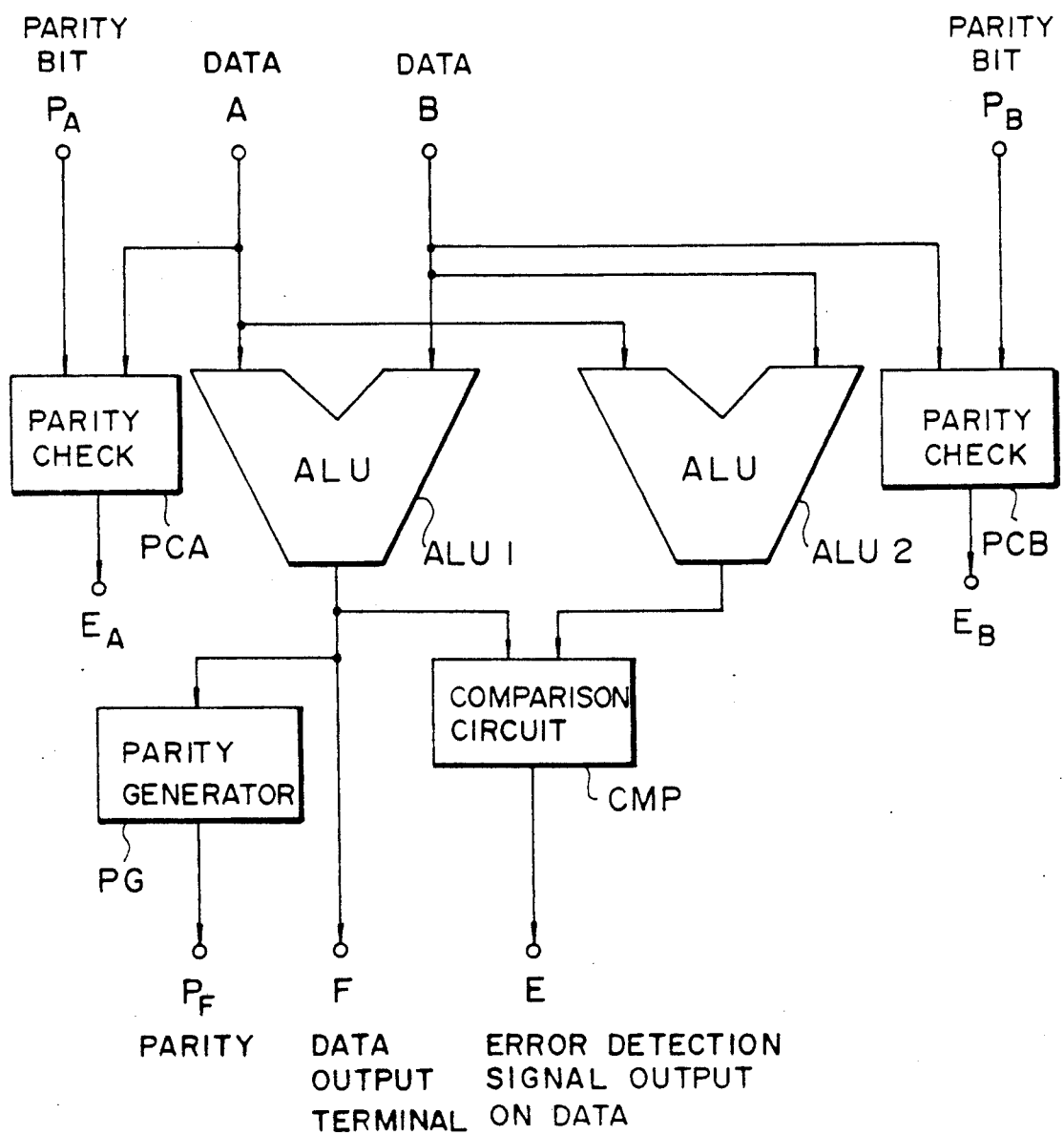
FIG. 1 is a block diagram of a prior art example having doubled ALU units for detecting errors.
Figure 2:
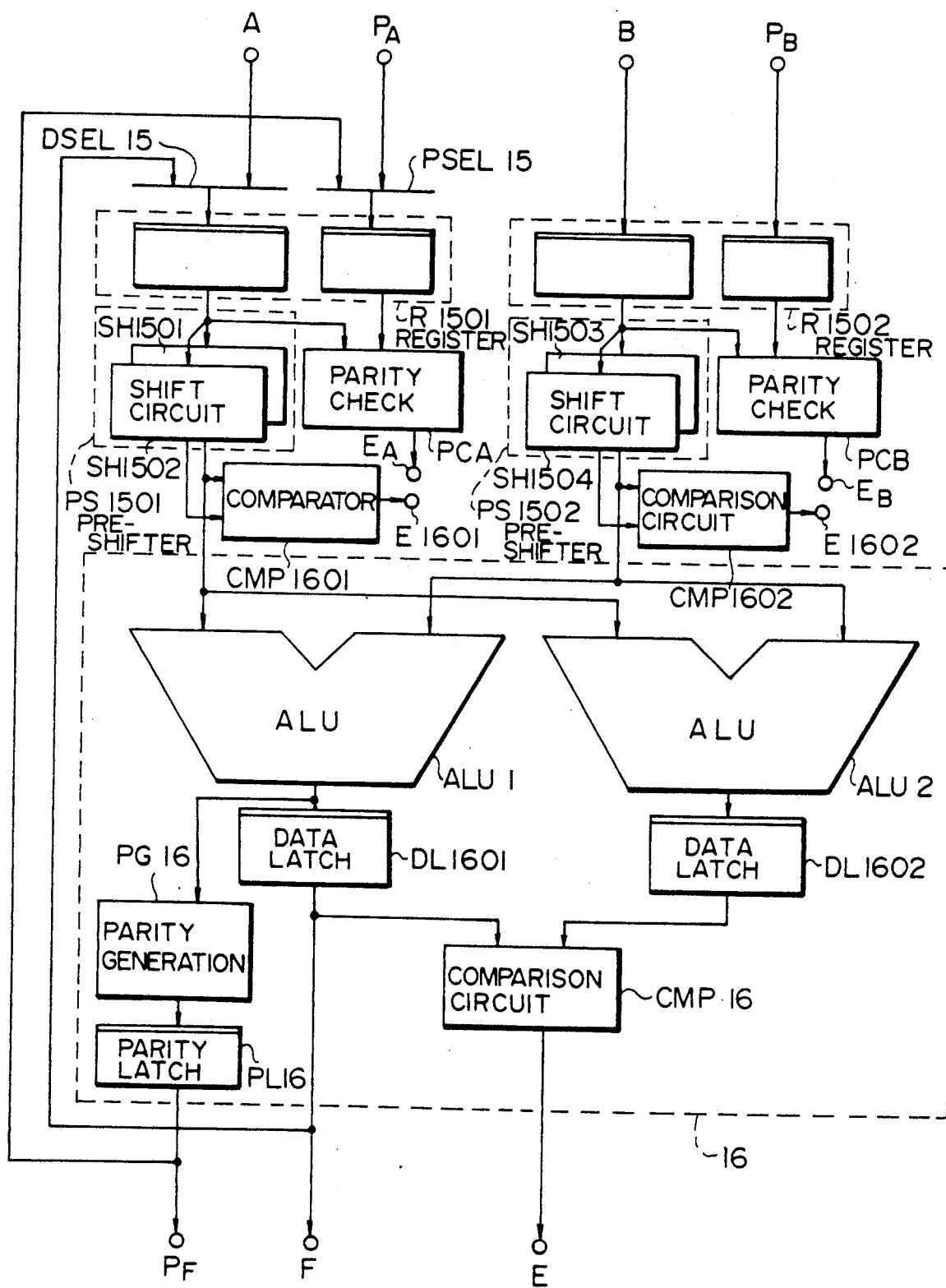
FIG. 2 is a block diagram of an example which applies the error detection by the doubled circuits to the operation unit comprising an ALU, a register and a pre-shifter.

Now, in the embodiment shown in FIG. 4, the error detection circuits 121 to 124 are provided for each stage and when, for example, the parity is used as the error detection code, one bit error in each stage of the circuit can be detected. The error detecting ability of the prior art shown in FIG. 1 is one bit in the whole circuit including doubled ALU1 and ALU2. Therefore, when the error detecting ability of the embodiment of this invention using the parity bit is set at one bit in the whole circuit similar to the doubled arrangement, the error detection circuits can be reduced compared to the embodiment of FIG. 4. Now, an embodiment which has reduced the error detection circuits will be explained.

Figure 9:
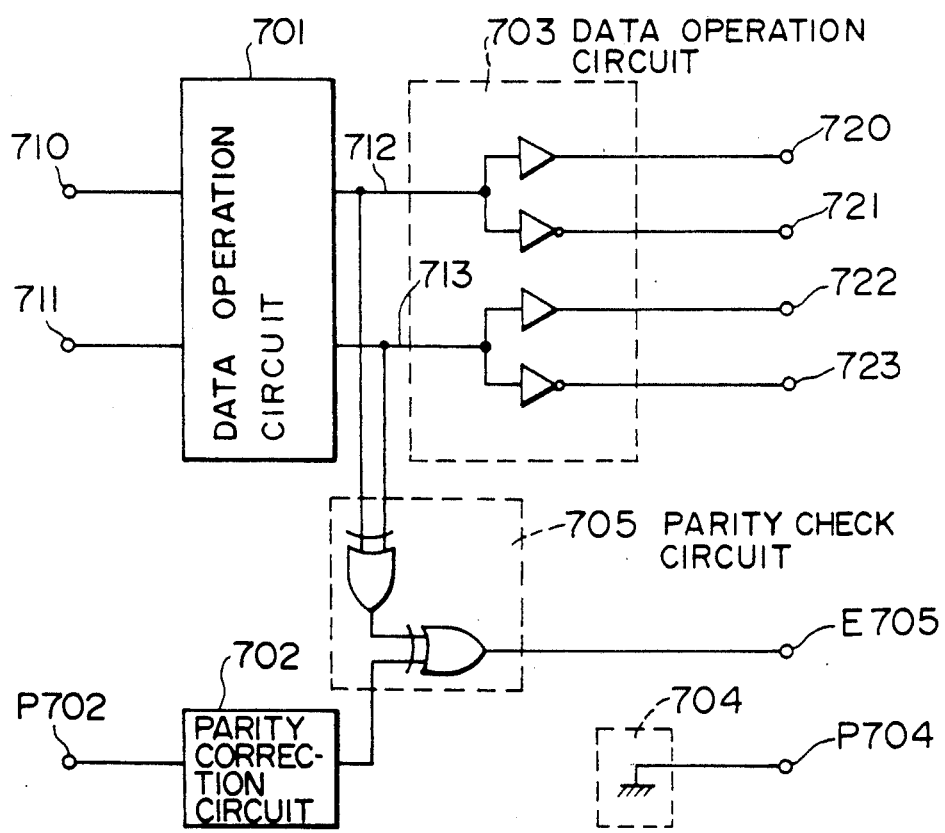
FIGS. 9, 10A and 10B are circuit diagrams for illustrating examples of the circuit requiring parity check.

Generally, when a plural stages of such circuits are connected in series that propagates a parity error of the input signal to the output signal, one bit error occurred in the intermediate circuits can be detected by checking the parity of the final stage output. Therefore, when the error detecting ability is set at one bit in the whole circuit, it is only necessary to provide a parity check circuit to the final stage output and to the input of such circuits which do not propagate the parity error in the input to the output. FIGS. 9 and 10 respectively show examples of the circuit which does not propagate the parity error and the parity check circuit for the input signal. Explanation will be made hereinbelow referring to these figures.

FIG. 9 shows an example in which the parity is degenerated. In the figure, reference numerals 701 and 703 denote data operation circuits, 702 and 704 parity correction circuits, 705 a parity check circuit, 710 to 711 input signals to the data operation circuit 701, 712 to 713 input signals to the data operation circuit 703, 720 to 723 output signals of the data operation circuit 703, P702 an input signal to the parity correction circuit 702, P704 an output signal of the parity correction circuit 704, and E705 an output signal of the parity check circuit 705. Here, the data operation circuit 701 of FIG. 9 corresponds to one of the data operation circuits 111 to 113 of FIG. 4. Similarly correspondence of the parts in FIG. 9 to those in FIG. 4 are made as follows; the parity correction circuit 702 to one of the error detection code correction circuits 131 to 133 corresponding to the data operation circuit 701, the parity check circuit 705 to one of the error detection circuits 121 to 123 corresponding to the data operation circuit 701 and the parity correction circuit 702, the data operation circuit 703 to the second stage data operation circuit of the circuit 701, and the parity correction circuit 704 to the error detection code correction circuit corresponding to the data operation circuit 703. In the operation circuit 703, with respect to an input signal 712, a signal of the same polarity is outputted as the output 720 and a signal of the inverted polarity is outputted as the output 721. Also with respect to an input signal 713, signals of the both polarities are outputted as the outputs 722 and 723, in the similar manner. Here, the parity of the output signal 720 to 723 of the data operation circuit 703 becomes always an even number and the output parity P704 becomes always 0 (in the case of even number parity). In this way, the output parity P704 of the operation circuit 703 is degenerated to an even number regardless of the input data 712 to 713. Therefore. even when there is a parity error in the input signals 712 to 713 for the circuit 703, the error is not propagated to the output signals 720 to 723. Therefore, it is necessary to provide a parity check circuit 705 for the input signal of the operation circuit 703 and to perform error detection in the operation circuit before 701.

Figure 10A:
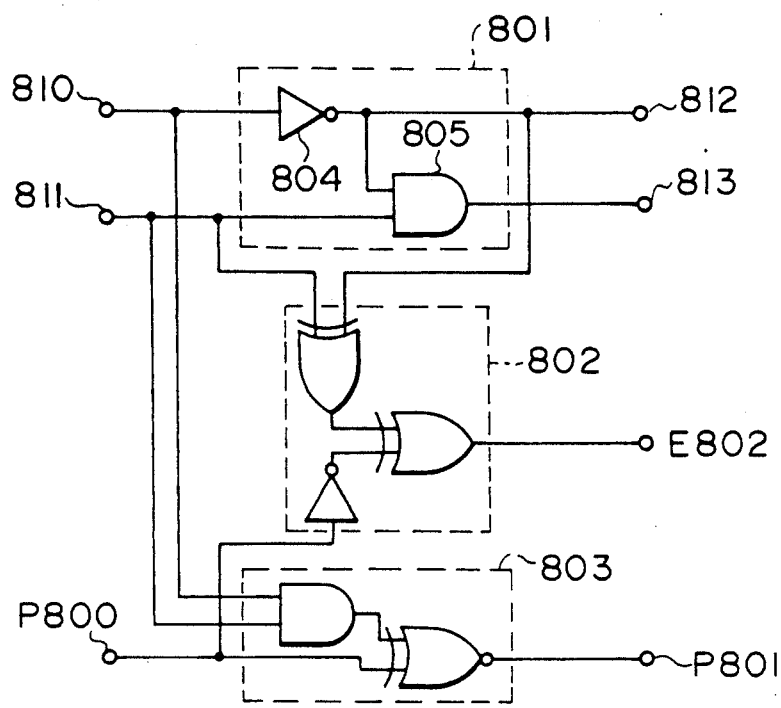
Figure 10B:
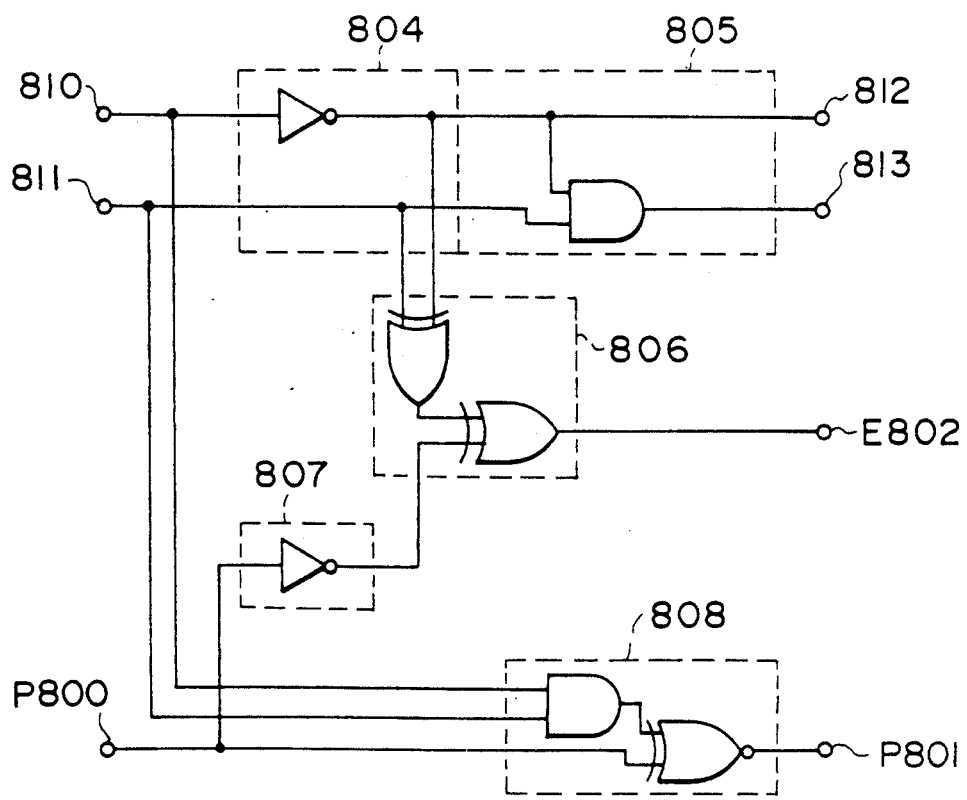

Next, FIGS. 10A and 10B show an example in which a one bit error occurred in an operation circuit becomes a two bits error as the output signal and hence the ordinary parity check cannot detect the error. In FIGS. 10A and 10B, reference numerals 801, 804 and 805 denote data operation circuits, 803 and 808 parity correction circuits, 802 and 806 parity check circuits, 804 and 805 logic circuits in the data operation circuit 801, 810 and 811 input signals to the data operation circuit 801, 812 and 813 output signals from the data operation circuit 801, P800 the parity input of the circuit 803, P801 the parity output of the circuit 803, and E802 the output of the circuit 802. There are correspondences between the parts in FIG. 10A and those in FIG. 4 as follows: the circuit 801 to one of the data operation circuit 111 to 114, the circuit 803 to one of the error detection code correction circuits 131 to 134 corresponding to the circuit 801, the circuit 802 to one of the error detection circuit 121 to 124 corresponding to the circuits 801 and 803.

In the circuit of FIG. 10A, there are cases when one-bit error occurred in the logic circuit 804 becomes a two-bits error in the output signal of the operation circuit 801. For example, when both the input signals 810 and 811 are "1", the output signals 812 and 813 are both "0" when there is no error. Here, when there occurs an error in the logic circuit 804 to make the output thereof "1", the output of the logic circuit 805 is also inverted and both the outputs 812 and 813 become "1". Here, since the two bits of the outputs are inverted simultaneously, it is not possible to detect the error only by the parity check of the output signal. For detecting this, it becomes necessary to perform the parity check by providing a parity check circuit 802. The input data of this parity check circuit 802 changes only by one bit even when an error occurs in the logic circuit 804, thereby it is possible to detect the error by the parity check.

Although the embodiment of FIG. 10A may appear to have a different construction than other embodiments (for example FIG. 6), it will be seen by rewriting the circuit, e.g. dividing the operation circuit 801 into two parts 804 and 805, that it has a similar construction as the other embodiments as shown in FIG. 10B. Namely, the parity correction circuits 807 and 808 correspond to the operation circuits 804 and 805, respectively. Further, it can be seen that the reason of the case where the parity cannot be corrected by the parity correction circuit 808 as explained above is because the correction data of the parity correction circuit 808 is not taken from the input of the operation circuit 805 but from the input of the operation circuit 804.

As described above, as the circuit in which the parity error does not propagate, there are (1) such circuits in which the data parity is degeneraged as in FIG. 9, and (2) such circuits in which a one-bit error in the inside changes into an even number of errors, 2 or more, at the circuit output, as in FIGS. 10A and 10B. Therefore, in the stages which employs these kinds of circuit, it is necessary to perform the parity check to the input data. In other stages, the parity check can be dispensed with.

Figure 11:
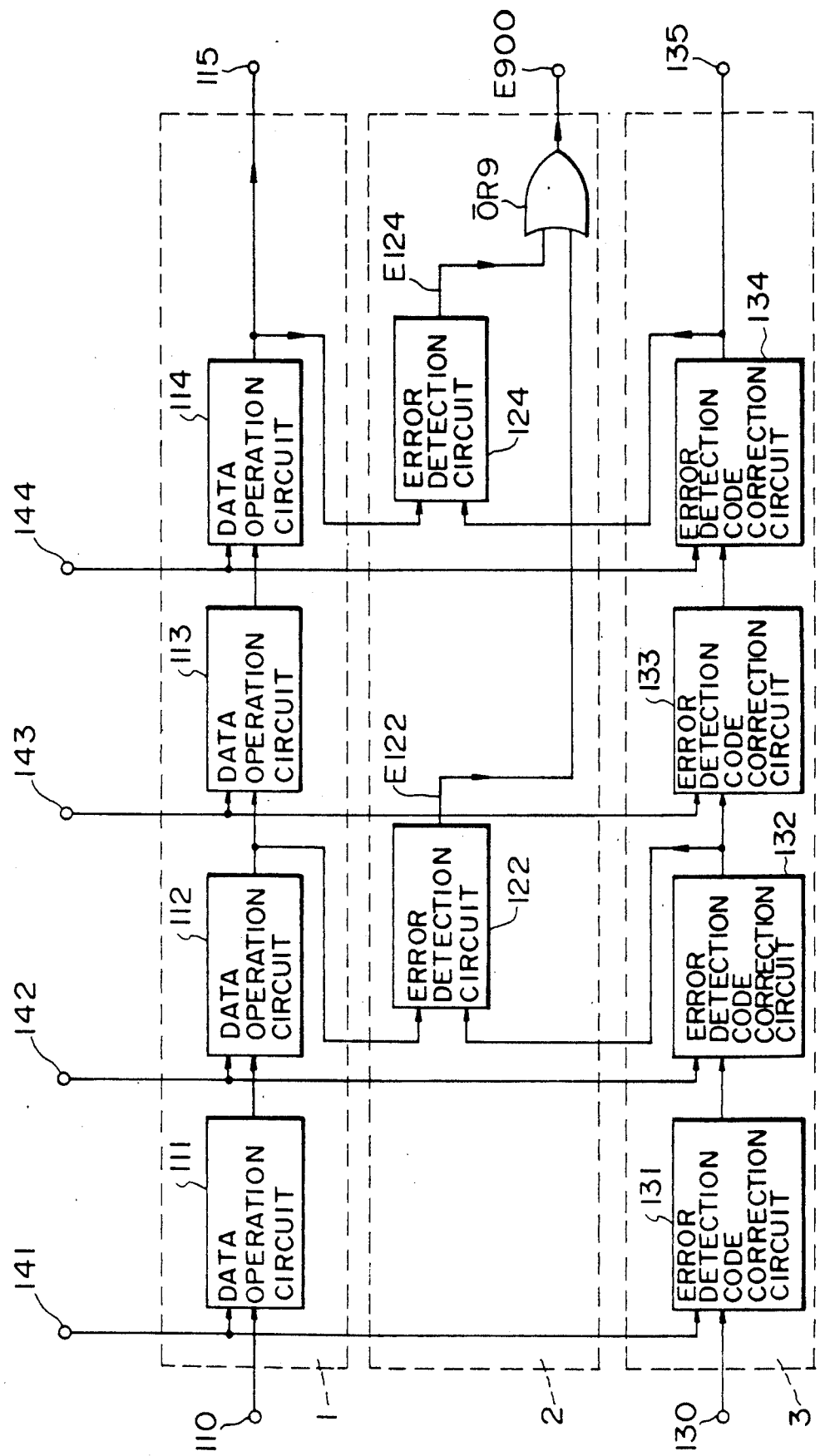
FIG. 11 is a block diagram of an embodiment of the present invention.

FIG. 11 shows an embodiment based on the embodiment of FIG. 4 and having its parity check circuit simplified as stated above. In the figure, reference symbol OR9 denotes an OR circuit, and E900 a parity error detection signal output terminal. It is assumed that among the operation circuits 111 to 114 only the one 113 corresponds to the above-mentioned kind which requires parity check of the input data. As examples of such operation circuit, there are the operation circuit 703 shown in FIG. 9, the operation circuit 801 shown in FIG. 10A, etc. In the embodiment of FIG. 11, the parity check circuits required to afford a detection ability of one bit similar to the doubled arrangement are only the circuits 122 and 124. In this embodiment, the outputs of these parity check circuits are integrated in the OR circuit $\overline{OR9}$ and outputted from the terminal E900. By taking such a construction as shown in this embodiment, the number of parity check circuits can be reduced and a reduction in the lay-out area can be attempted.

Figure 12:
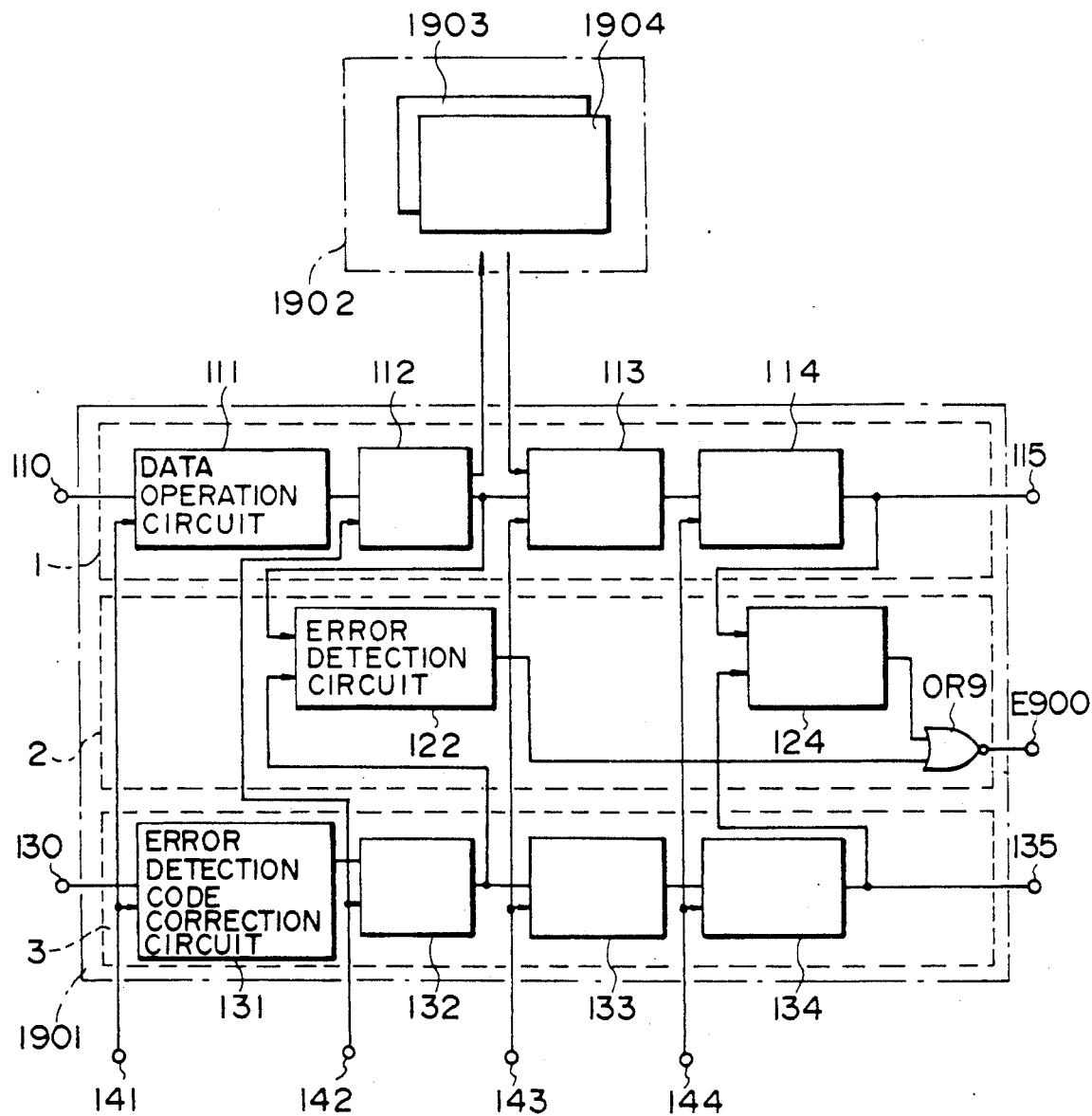
FIGS. 12 and 13 are block diagrams of the embodiments in which the present invention is applied to the ALU of the carry-look-ahead generator unit.
Figure 13:
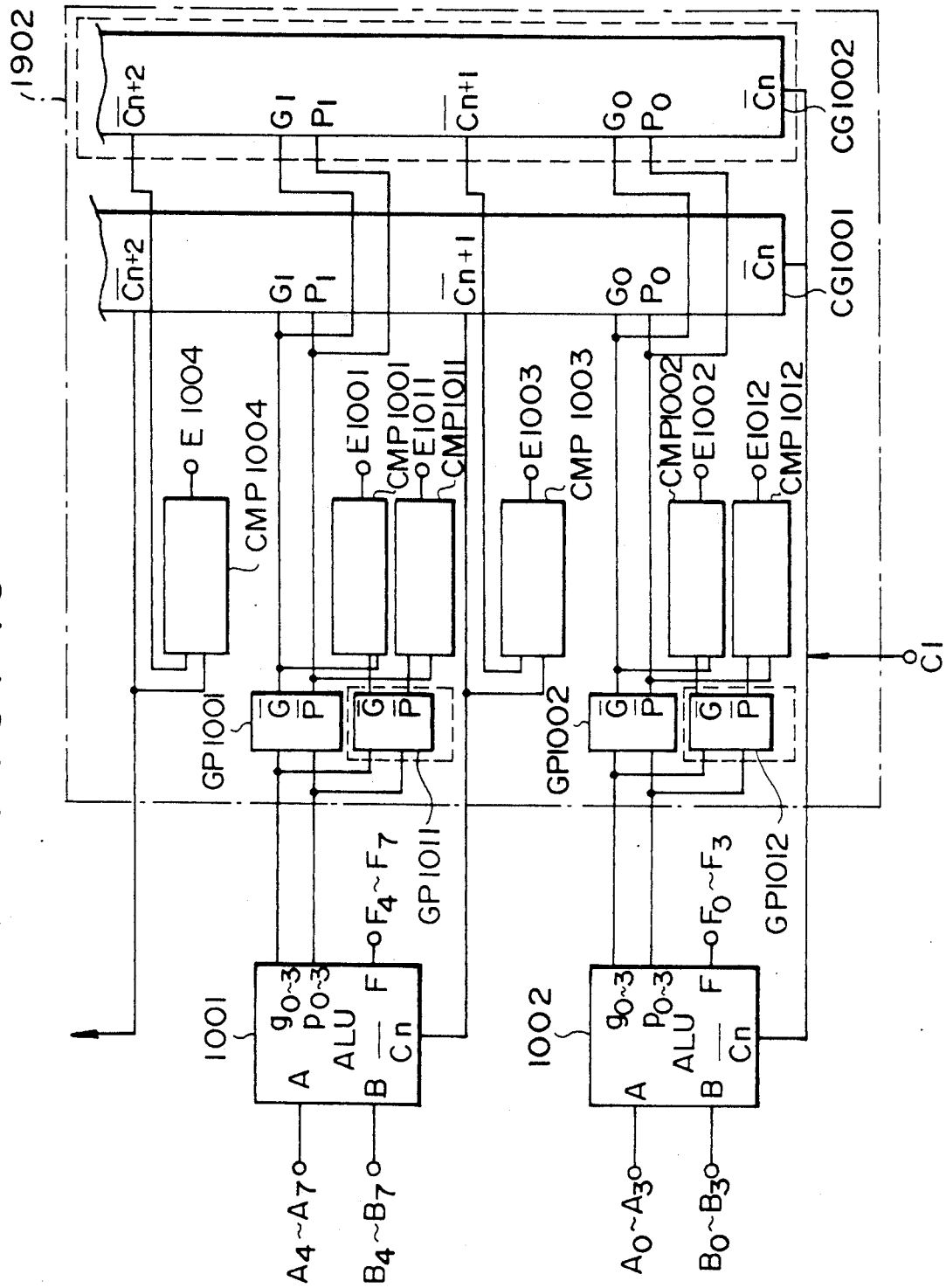

FIGS. 12 and 13 show embodiments wherein the inventive feature of this invention is applied to the ALU of the carry-look-ahead system. Here, the carry-look-ahead adder is described, for example, in "Ronrikairo no Kiso" (Fundamentals of Logic Circuits) by Keikichi Tamaru, page 220. In FIG. 12, reference numeral 1901 denotes a 4 bits ALU as shown in FIG. 5 or 11, 1902 a carry-look-ahead generator unit, and 1903 and 1904 carry-look-ahead generator circuits in the carry-look-ahead generator unit 1902. In the carry-look-ahead generator unit 1902, the generator circuits 1903 and 1904 are the circuits of the same construction. Error detection in the carry-look-ahead generator unit 1902 is done by this doubled arrangement. FIG. 13 shows a structure in the generator unit 1902 of FIG. 12. In FIG. 13, reference numerals 1001 and 1002 denote 4 bits ALUs, each corresponding to the ALU1901 of FIG. 12, CMP1001, CMP1011, CMP1002 and CMP1012 comparator circuits, CG1001 and CG1002 carry-look-ahead generators, and GP1001, GP1011, GP1002, and GP1012 carry generate/propagate signal generating circuits. In the embodiments of FIGS. 12 and 13, while the error detection within the 4 bits ALUs 1901, 1001 and 1002 is achieved by the similar constructions as in the embodiment shown in FIG. 5, the error detection in the carry-look-ahead generator unit 1902 is achieved by the doubled circuits. Namely, three pairs of GP1001 and GP1011, GP1002 and GP1012, and CG1001 and CG1002 are the respective doubled circuits pairs, error detection is done in the comparator circuits CMP1001, CMP1011, CMP1002, CMP1012, CMP1003, and CMP1004. The reasons of taking a circuit arrangement as described above are as follows.

(1) In the ALU unit, since the circuit scale is large, the error detection through the doubled circuit arrangement will increase the lay-out area largely. Whereas, error detection can be done through relatively small scale detection circuits by adding the parity bits.

(2) The carry-look-ahead generator unit has a relatively small circuit scale. Thus, the error detection through the doubled circuit arrangement is more advantageous from the point of lay-out area.

In this way, a logic circuit of the construction utilizing the error detection code such as the parity and a logic circuit of the construction employing the error detection by the doubled circuit arrangement are selectively used in accordance with the characteristics of the logic circuit. Hence, the two kinds of logic circuits co-exist. Thereby, improvements in the high speed operation and the high integration density are simultaneously attained as a whole.

Figure 14:
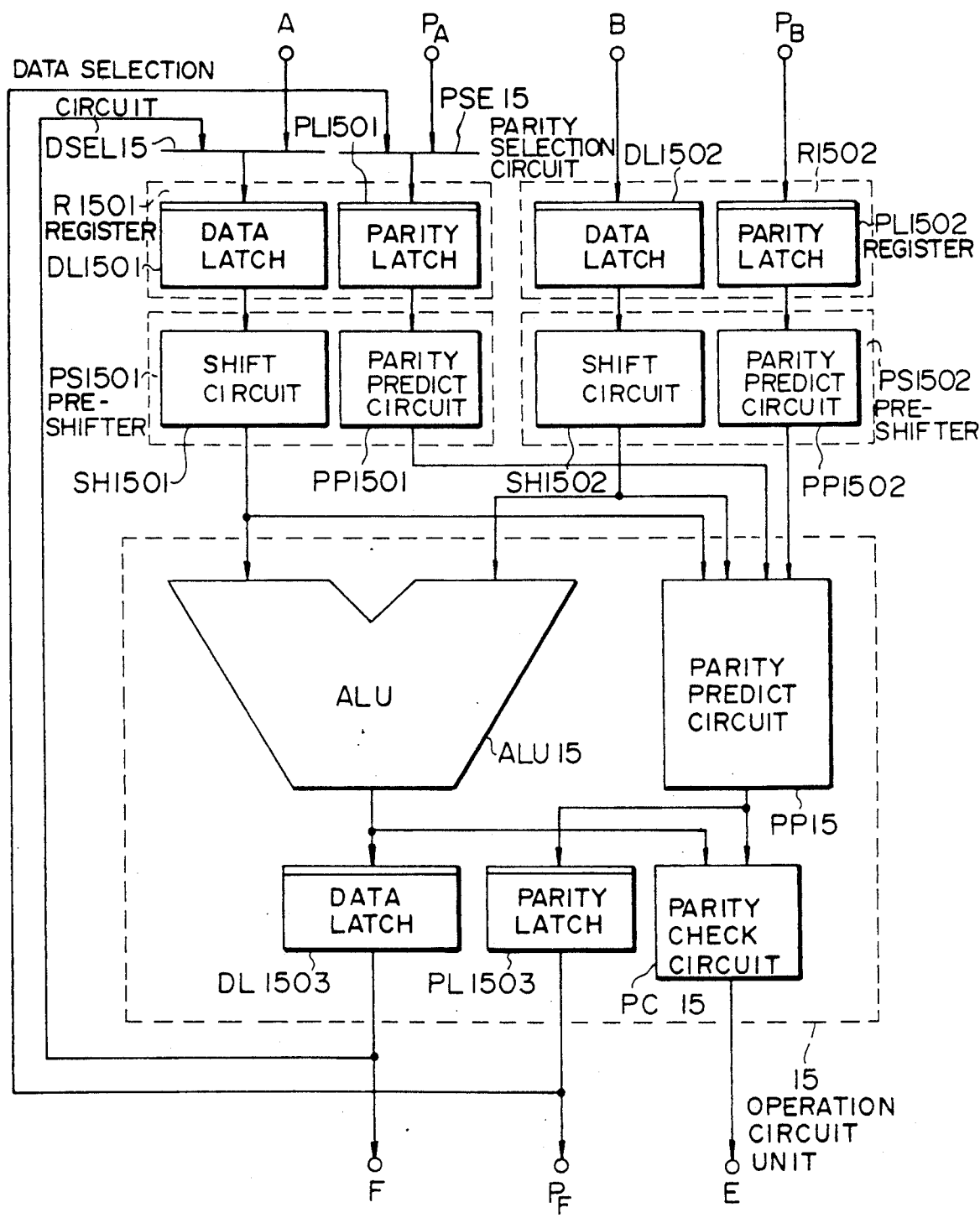
FIG. 14 is a block diagram of an embodiment where in the present invention is applied to the operation unit.

Next, description will be made on an embodiment in which the inventive feature of this invention is applied not only to the ALU portion but to the whole operation unit including the ALU In FIG. 14, reference numeral 15 denotes an operation circuit unit, R1501 and R1502 registers, PS1501 and PS1502 pre-shifters, DL1501 to DL1503 data latches, PL1501 to PL1503 parity latches. SH1501 and SH1502 shift circuits, PP1501, PP1502 and PP15 parity predict circuits, PC15 a parity check circuit, DSEL15 a data selection citcuit, PSEL15 a parity selection circuit and ALU15 an arithmetic logic unit. Here, the ALU15 in the operation circuit unit 15 corresponds, for example, to the data operation unit 1 of FIGS. 4, 5 and 11, the parity predict circuit PP15 to the error detection code correction unit 3, and the parity check circuit PC15 to the error detection circuit 124 or 324. Namely, the parity bit together with the data to be subjected to the operation is inputted to the operation circuit unit 15 and prediction operation of the parity corresponding to the operation result is performed in the parity predict circuit PP15 in parallel with the data operation in the ALU15. The operation result and the predicted parity are both outputted from the operation circuit unit 15 as the outputs F and $P_F$. Errors in the input data for the operation circuit unit and in the operation actions are detected by performing the parity check in the parity check circuit PC15. Therefore, the action of the operation circuit unit 15 is similar to that of the embodiment of FIG. 4, 5 or 11. In the embodiment of FIG. 14, as the data inputs to the operation citcuit unit 15, the outputs of the shift circuits SH1501 and SH1502 in the pre-shifters PS1501 and PS1502 are added, and as the parity bit inputs, outputs of the parity predict circuits PP1501 and PP1502 in the pre-shifters PS1501 and PS1502 are added. By taking such a circuit construction as shown in this embodiment, there is formed a parity path comprising parity latch (PL1501, PL1502)→parity predict circuit (PP1501, PP1502) in pre-shifter→parity predict circuit (PP15) in operation circuit unit→parity latch (PL1502)→parity output terminal ($P_F$) or parity selection circuit (PSEL15)→parity latch (PL1501) in conformity with the data path comprising data latch (DL1501, DL1502)→shift circuit (SH1501, SH1502)→ALU (ALU15)→data latch (DL1503)→data output terminal (F) or data selection circuit (DSEL15)→data latch (DL1501). In these two kinds of paths, there are pairs of the corresponding circuits, such as the data latch DL1501 and the parity latch PL1501, the shift circuit SH1501 and the parity predict circuit PP1501. The error can be detected by performing the parity check using the output data and the parity bit of the respective stages. Here, the "error" mentioned here include the error in the input data and the erroneous action of the circuit. Therefore, the errors in the whole data path can be detected by detecting mis-match of the data path and the parity path in the parity check circuit PC15 provided in the operation circuit unit 15. The error detection circuit for the ALU input data which was necessary in the prior art becomes unnecessary. Reduction in the lay-out area and increase in the integration density in the LSI chip can be made.

Figure 15:
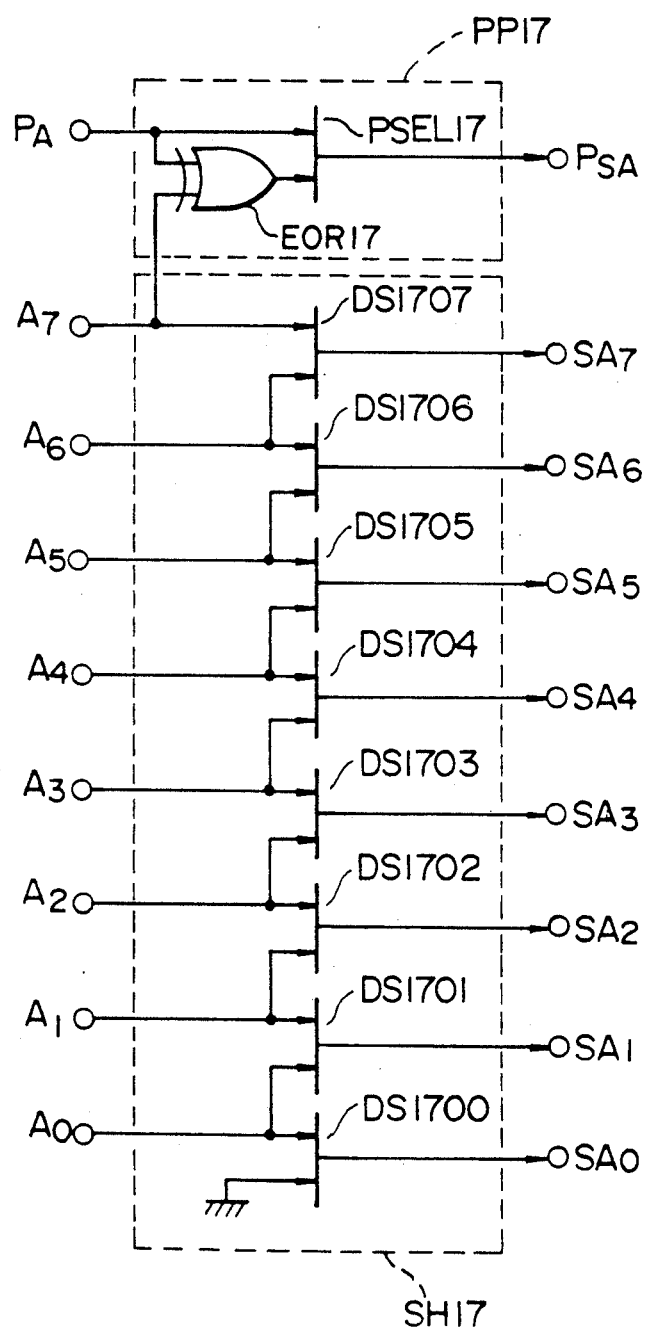
FIG. 15 is a block diagram illustrating an example of a pre-shifter used in the embodiment of FIG. 14.

FIG. 15 shows an example of the pre-selector PS1501 or PS1502 shown in FIG. 15. In the figure, reference symbols $A_7$ to $A_0$ denote data input terminals, $P_A$ a parity input terminal, SH17 a shift circuit PP17 a parity predict circuit, $SA_7$ to $SA_0$ data output terminals, $P_{SA}$ a parity output terminal, DS1700 to DS1707 data selectors, PSEL17 a parity selector, and EOR17 an exclusive OR (EOR) circuit. This preshifter has a function that with respect to the input of a eight-bits input data and a parity bit, the data without any change or with one-bit leftward shift is allowed to be outputted with the associated parity bit. Here, the parity predict circuit PP17 has such a construction that the prediction of the parity bit with respect to the output data is performed using the input data and the input parity bit and is outputted from the terminal $P_{SA}$. In the pre-shifters having other functions as described above, the prediction of the parity bit can similarly be done by altering the parity predict circuit and be outputted.

As has been described hereinabove, by applying the inventive feature of this invention to the operation unit on an LSI chip, the doubled arrangement of the operation circuit becomes unnecessary and the number of error detection circuits can be reduced. Thus, the area of the lay-out can be reduced.

In the embodiment of FIGS. 12 and 13, the carry-look-ahead generator unit has such a construction that the circuit (e.g. carry generate/propagate signal generation circuit GP, carry-look-ahead generator CG) is doubled and the outputs of the doubled circuits are compared in a comparison and check circuit to detect an error. In such a construction, a diagnosis circuit for detecting an error of the comparison and check circuit becomes necessary as described in connection with FIG. 3. Further, regarding this diagnosis circuit, one diagnosis circuit is necessary for one bit of the output of the doubled circuits. For example, 32 diagnosis circuits are needed in a 32-bits logic circuit. Thus, a multiplicity of diagnosis circuits become necessary. In the present invention, the supply system of the clock signal for each of the doubled operation circuits is divided into a supply system of the clock signal for the switch circuits for deriving the output signals of the logic network in the operation circuit and a supply system of the clock signal for other switch circuits in said operation circuit. Thereby, the diagnosis function for the comparison and check circuit can be afforded to the operation circuit itself. As the result, the diagnosis circuit becomes unnecessary. Thereby, reduction in the lay-out area and the speed-up of the comparison and check circuit can further be achieved.

Figure 16A:
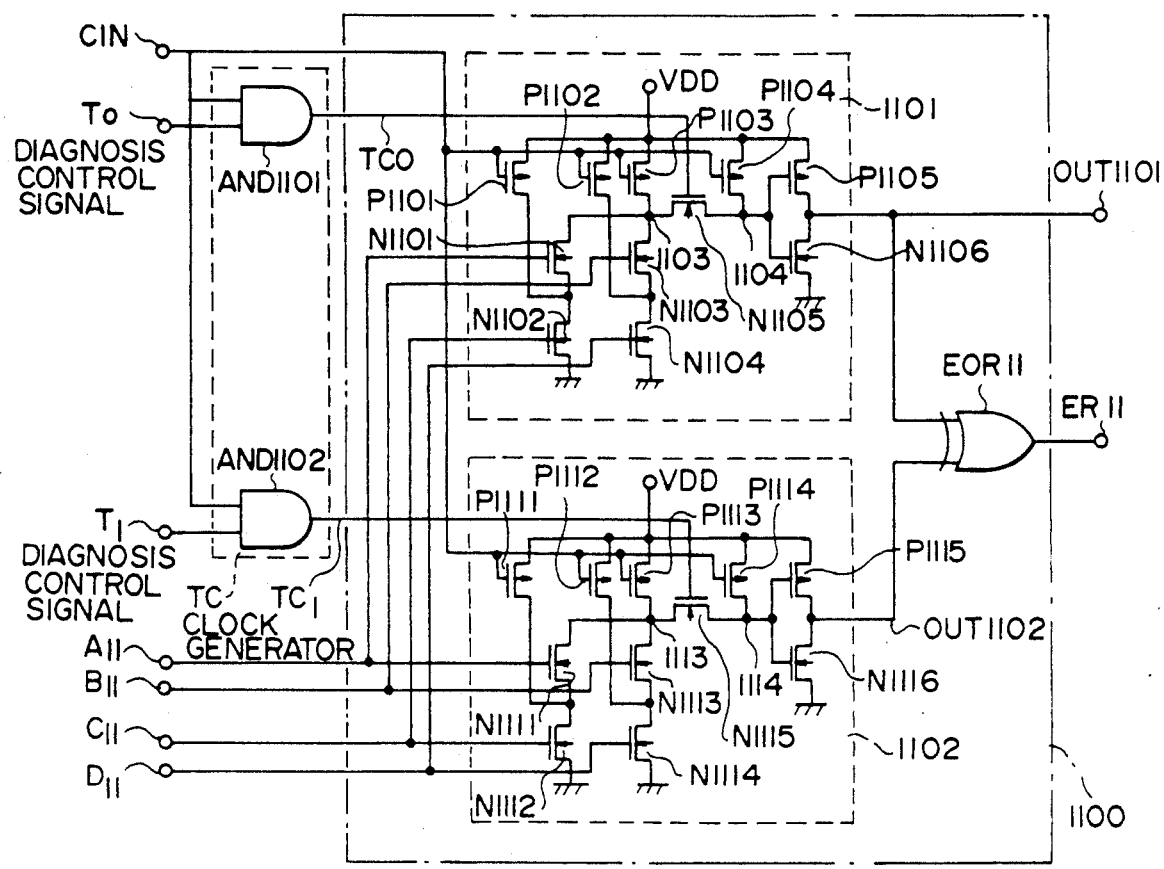
FIG. 16A is a circuit diagram illustrating a logic circuit incorporating therein an error detection circuit according to an embodiment of this invention.
Figure 16B:
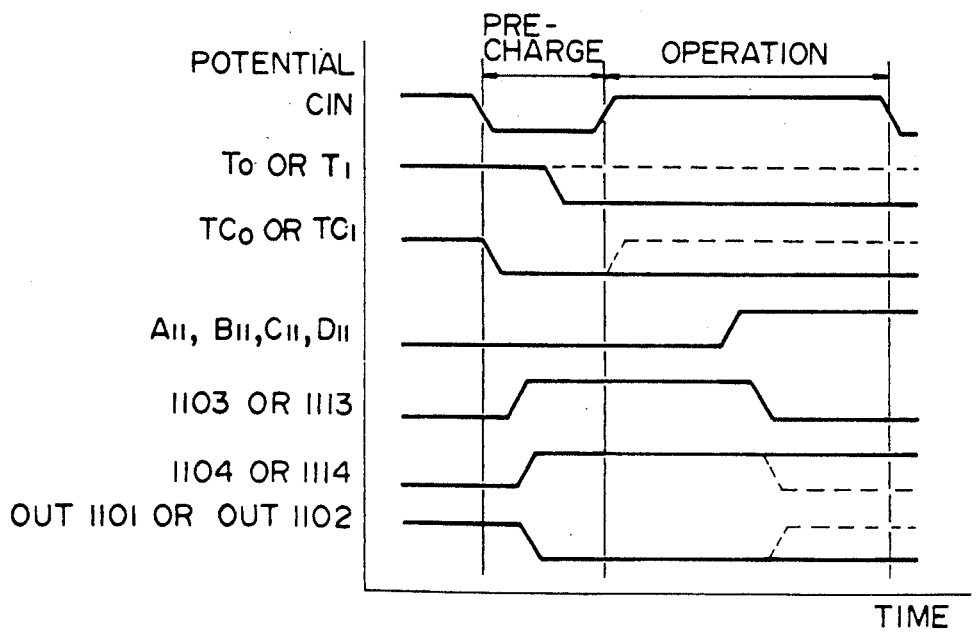
FIG. 16B is a diagram showing examples of waveforms appearing in the circuit of FIG. 16A.

FIG. 16A shows a structure of an embodiment of a logic circuit employing the doubled arrangement as the method of detecting an error. FIG. 16B show operation waveforms at various parts of the circuit of FIG. 16A. In FIG. 16A, reference numeral 1100 denotes a logic circuit incorporating an error detection circuit therein, 1101 an operation logic circuit, 1102 an error detecting logic circuit having the same circuit construction as the circuit 1101, A11, B11, C11 and D11 input signals common to the circuits 1101 and 1102, OUT1101 an output signal of the circuit 1101, OUT1102 an output signal of the circuit 1102, EOR11 a comparison circuit, ER11 an error detection signal, P1101 to P1105 and P1111 to P1115 PMOSFETs, N1101 to N1106 and N1111 to N1116 NMOSFETs, 1103 and 1104 internal nodes of the circuit 1101, 1113 and 1114 internal nodes of the circuit 1102, CIN, TC0 and TC1 clock signals, $T_0$ and $T_1$ diagnosis control signals, TC a clock generation circuit, and AND1101 and AND1102 AND circuits in the circuit TC. It may be mentioned that JP-A-62-98827 relates to a dynamic type logic circuit as shown in this embodiment. In this embodiment, in the logic circuit 1101, with respect to the input signals A11 to D11, the logic circuit network of the FETs N1101 to N1104 performs the operation

A11·C11+B11·D11.

The operation result is outputted at OUT1101 through the FETs N1105 and the buffer circuit (formed of FETs P1105 and N1106). On the other hand, the same operation is done also in the logic circuit 1102 and the result is outputted at OUT1102. These outputs are compared and checked in the comparison and check circuit EOR11 to detect the error in the operation result. In contrast to the prior art shown in FIG. 3, where the same clock signal is applied to CIN, TC0 and TC1, in the present embodiment, the result of the AND operation of the clock signal CIN and the diagnosis control signal T0 is used as the clock signal TC0, and the result of the AND operation of the clock signal CIN and the diagnosis control circuit TI is used as another clock signal TCI. The circuit operation of this embodiment will be described referring to the operation waveforms of FIG. 16B.

In FIG. 16B, those curves shown in solid lines represent waveforms in the diagnosis mode of the comparison circuit EOR11, and those shown in broken lines represent waveforms in the normal operation. First, description will be made on the normal operation shown by broken lines. In this case, the clock signals TCO and TCI become clock signals in phase with the clock signal CIN similar to the prior art by setting the diagnosis control signals TO and TI at the high level. Here, since the logic circuits 1101 and 1102 have the same construction, the description will be made on the logic circuit 1101 hereinbelow and the description on the logic circuit 1102 will be dispensed with. Firstly, prior to the operation, input signals A11 to D11 are set at the low level and the clock signal CIN is set at the low level for performing the pre-charge action. Then, the clock signal TCO becomes of the low level. Whereby, the PMOS FETs P1101 to P1104 are turned on and NMOS FETs N1101 to N1105 are turned off, and the parasitic capacitances existing at the node 1103 and the node 1104 are charged to raise the potential at these nodes to the high level, thereby completing the pre-charge action. Next, the clock signal CIN is set at the high level for initiating the operation action, then the clock signal TCO becomes of the high level and the PMOS FETs P1101 to P1104 are turned off. Here, when part or whole of the input signals A11 to D11 is set at the high level so that the path between the node 1103 and the ground is in the conductive state, the parasitic capacitance existing at the node 1103 is discharged. As the potential of the node 1103 drops, NMOS FET N1105 becomes turned on to decrease the potential of the node 1104 also. Thus, both the nodes become of the low level. Since the node 1104 is connected to the gate of the CMOS inverter including the PMOS FET P1105 and the NMOS FET N1106, the potential of the output terminal OUT1101 rises to the high level. This is the ordinary action.

Next, description will be made on the action in the diagnosis mode of the comparator circuit EOR11 shown by the solid lines in FIG. 16B. This diagnosis control signals TO and TI at the low level and thereby forcing either of the outputs OUT1101 and OUT1102 corresponding to the diagnosis control signals TO and TI to be at the low level. The following description will be made on the case when the diagnosis control signal TO is set at the low level. Firstly, the precharge action is performed by setting the clock signal CIN at the low level, similar to the normal operation, to make the nodes 1103 and 1104 at the high level. Next, the clock signal CIN is set at the high level to perform the operation action. At this time, when the diagnosis control signal TO is at the low level, the clock signal TCO keeps the low level, being different from the normal operation. Here, when such input signals A11 to D11 which render the path between the node 1103 and the ground in the conductive state, are applied, the potential of the node 1103 drops to the low level similar to the normal operation. However, since the clock signal TCO is at the low level, the NMOS FET N1105 is not turned on. Thus, the node 1104 is kept at the high level and the potential of the output signal OUT1101 becomes of the low level. In this way, according to this embodiment, one of the inputs of the comparator circuit EOR11 can be fixed at the low level by setting one of the diagnosis control signals TO and TI at the low level. The diagnosis of the comparison circuit EOR11 can be done utilizing this. Here, in the above description when the following substitutions are made, TI for TO, TCI for TCO, P111 to P1115 for P1101 to P1105, N1111 to N1116 for N1101 to N1106, nodes 1113 to 1114 for the nodes 1103 to 1104 and OUT1102 for OUT1101, the description will be on the logic circuit 1102.

Figure 3:
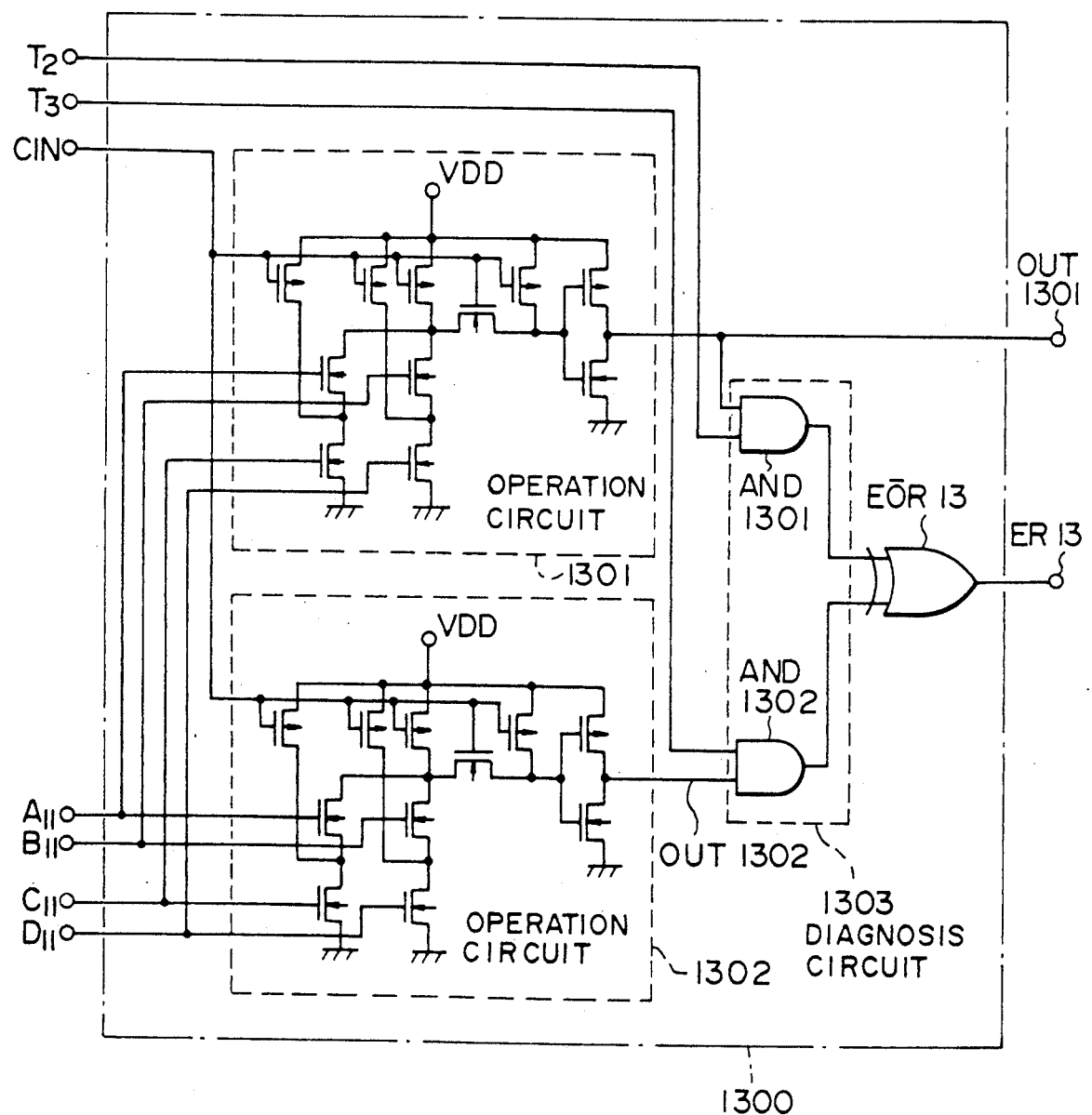
FIG. 3 is a block diagram illustrating an example of a logic circuit having the diagnosis function of the error detection circuit.

When this embodiment is compared with the prior art of FIG. 3, there exist the following features.

(1) The diagnosis circuit 1303 which was necessary in the prior art for performing diagnosis of the comparator circuit $\overline{EOR13}$ becomes unnecessary by the application of this invention. By this change reduction in the lay-out area of the logic circuit and reduction in the delay time of the error detection signal can be realized simultaneously.

(2) In the normal operation action, the circuit of this embodiment performs completely the same actions as in the prior art circuit. Therefore, there is no increase of the operation time by the employment of this invention.

In the embodiment of FIG. 16A, although the phases of the clocks TCO and TCI are delayed compared to the clock CIN due to the delay time in the clock generation circuit TC, there is no effect when the former is fixed prior to the input signals A11 to D11 and there is no increase in the operation time. Further, by changing the clock generation circuit TC, it is possible to arrange the clock CIN and the clocks TCO and TCI to be of the same phase. In such a case, completely the same clocks as those in the prior art can be supplied.

In the embodiment shown in FIG. 16A, the logic circuit 1101 is a circuit for performing an operation $$OUT1101 = A11 \cdot C11 - B11 \cdot D11.$$

By changing the construction of the logic circuit network unit formed of NMOS FETs N1101 to N1104 and N1111 to N1114 in the logic circuits 1101 and 1102, a logic circuit performing an operation other than the above can be realized.

Figure 17:
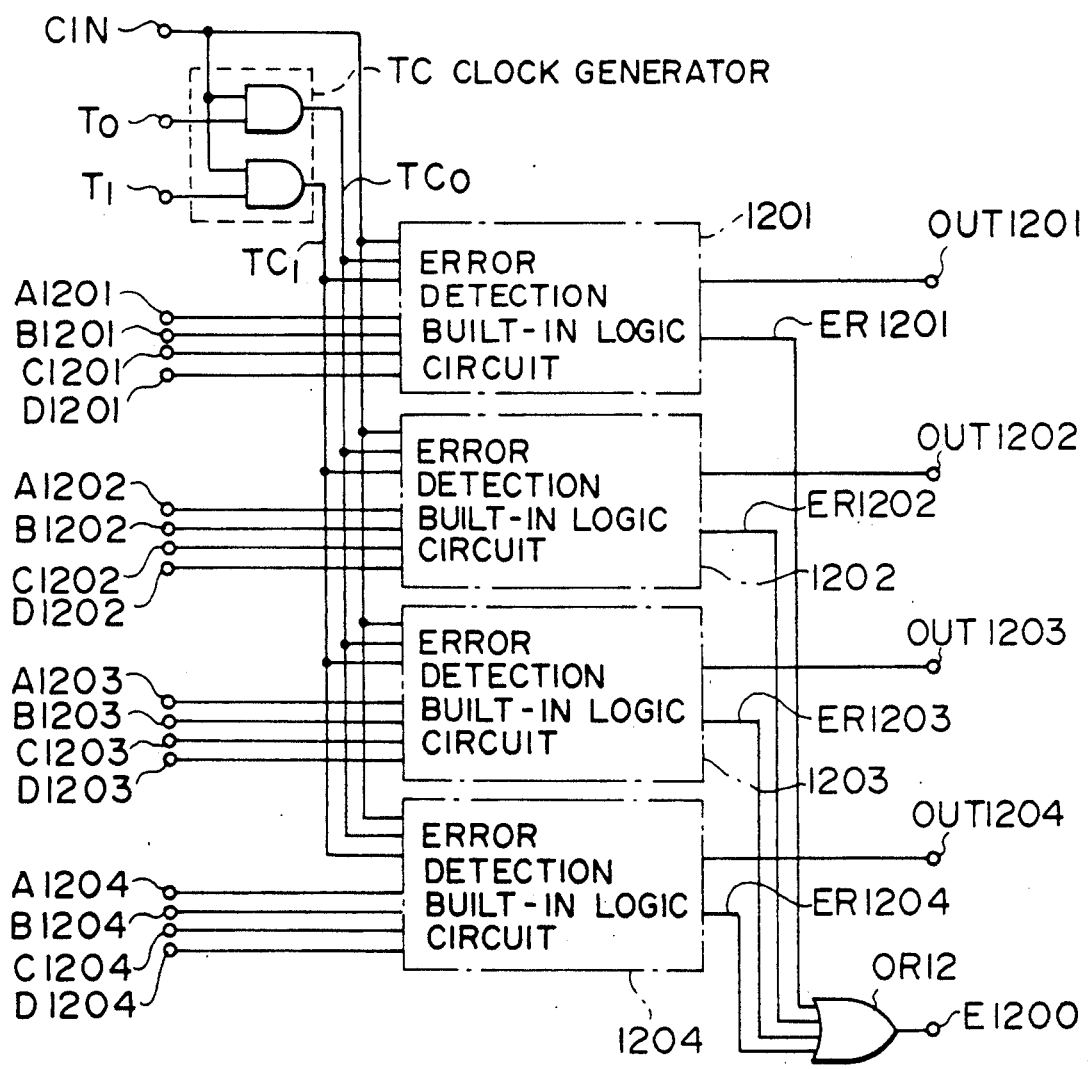
FIG. 17 is a circuit diagram of an embodiment in which the present invention is applied to a logic circuit incorporating therein a plurality of error detection circuits.

FIG. 17 shows an example in which a plurality of logic circuits 1100 each incorporating an error detection circuit therein, are used. In the figure, reference numerals 1201 to 1204 each denotes a logic circuit incorporating an error detection circuit therein having the circuit construction as shown by 1100 in FIG. 16, A1201 to A1204, B1201 to B1204, C1201 to C1204 and D1201 to D1204 input signals for the logic circuits 1201 to 1204, respectively, OUT1201 to OUT1204 output signals of the logic circuits 1201 to 1204, respectively, ER1201 to ER1204 error detection signals of the logic circuits 1201 to 1204, respectively, $\overline{OR12}$ an OR circuit, and E1200 an error detection signal. In this embodiment, one clock generation circuit TC is provided for four logic circuits 1201 to 1204 to supply clock signals CIN, $T_0$ and $T_1$. Further in this embodiment, the error detection signals ER1201 to ER1204 of the respective logic circuits are integrated in the OR circuit $\overline{OR12}$ and outputted as the output signal E1200. In the LSI, it is generated to activate a multiplicity of logic circuits in synchronism with one clock signal and to perform operations. In this case, the circuit construction may be as in the embodiment of FIG. 17 are only one clock generation circuit may be provided for the plurality of logic circuits on the same chip. It is thereby possible to reduce the layout area as a whole.

Figure 18:
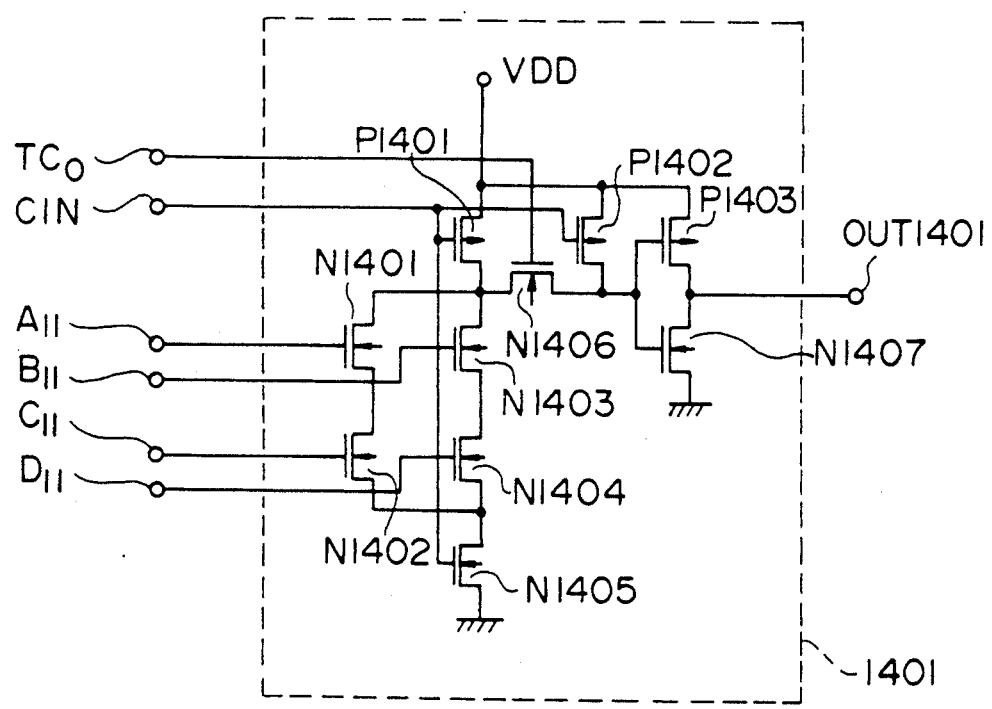
FIG. 18 is a circuit diagram illustrating another example of the operation circuit used in the present invention.

FIG. 18 is a diagram illustrating another embodiment of the dynamic logic circuit used in the present invention. In the figure reference numeral 1401 denotes a logic circuit, P1401 to P1403 PMOS FETs, N1401 to N1407 NMOS FETs, and OUT1401 the output signal of the logic circuit. This circuit 1401 is the circuit in which the inventive feature of this invention is applied to the dynamic logic circuit of such type that an NMOS FET N1405 is inserted between the logic circuit network unit including the NMOS FETs N1401 to N1404 and the ground, and has the same function as those of the logic circuits 1101 and 1102 of FIG. 16A, and can be used in direct substitution.

According to the embodiments of FIGS. 16 to 8, the diagnosis function of the comparison circuit can be afforded to without sacrificing the high speed operability of the dynamic logic circuit.

Figure 19:
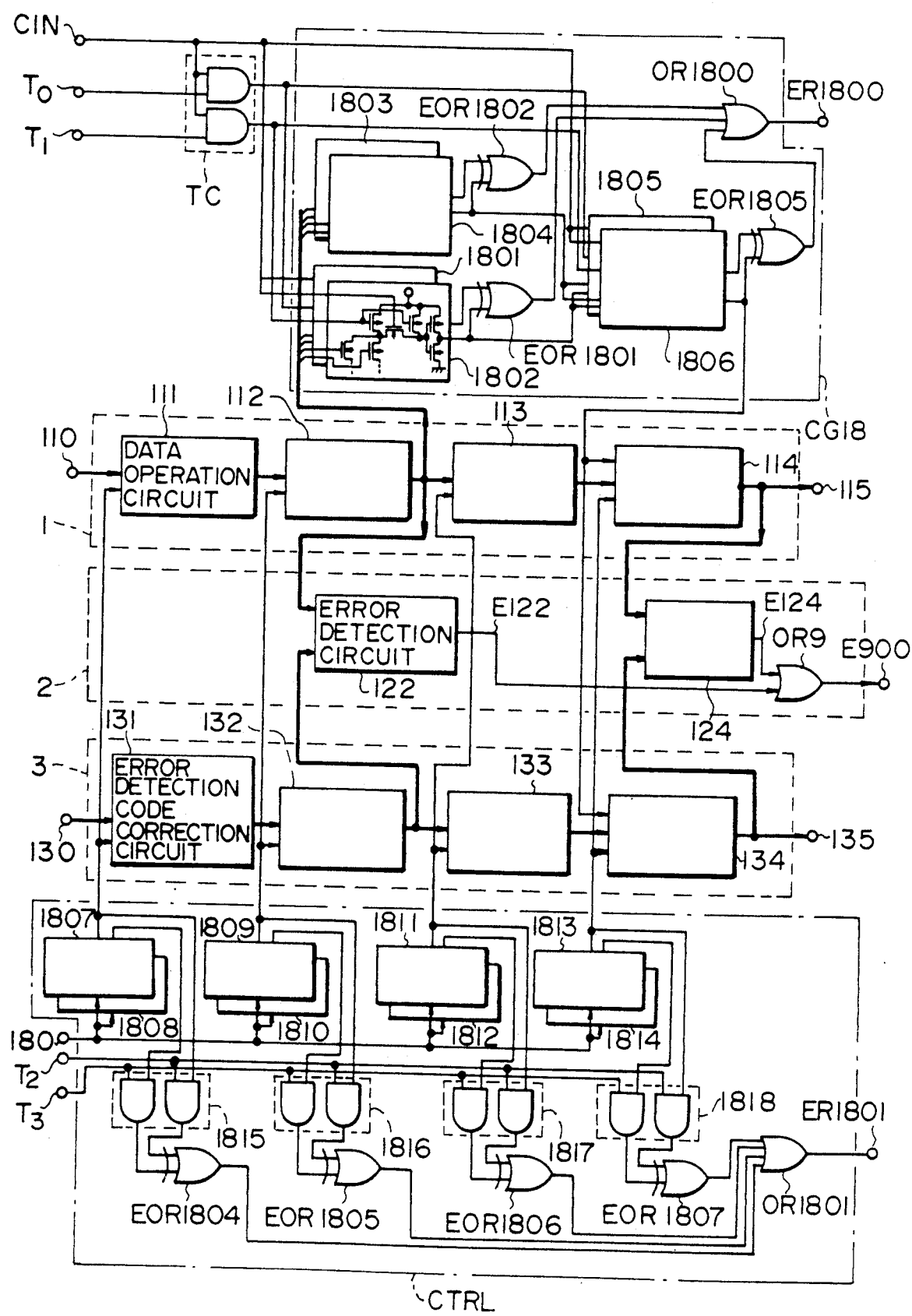
FIG. 19 is a circuit diagram of an embodiment in which the present invention is applied to the ALU of the carry-look-ahead generator system.

FIG. 19 shows an embodiment of an ALU including logic circuits having the three kinds of error detection function as described above. Namely, (1) a logic circuit utilizing the error detection code such as parity (for example, embodiments of FIGS. 4 and 11), (2) a logic circuit incorporating therein the diagnosis function for the error detection circuit which employs the doubled arrangement of the circuit and includes the diagnosis function for the error detection circuit and thereby has reduced the number of circuits (for example, embodiments of FIGS. 16 and 17), and (3) a logic circuit incorporating therein the error detection circuit by simply doubling the circuit (for example, the logic circuit of FIG. 3) are selectively used to construct an ALU in which these three kinds of logic circuit co-exist. In FIG. 19, reference symbol CG18 denote a carry-look-ahead generator, 1801 to 1806 logic circuits employing the above-mentioned structure (2) in the carry-look-ahead generator CG18, EOR1801 to EOR1803 EOR circuits, $\overline{OR}1800$ an OR circuit, CTRL a control circuit, 180 a control signal input terminal, $T_2$ and $T_3$ diagnosis control signals, 1807 to 1814 control signal generation circuits, 1815 to 1818 diagnosis circuits, EOR1804 to EOR1807 EOR circuits, $\overline{OR}1801$ an OR circuit, and ER1800 to ER1801 error detection signal output terminals. In this embodiment, in the portions 1 of the data operation unit except the carry generator CG18 and in the parity generating unit 3, logic circuits having the error detection function by the parity check are used similar to the case of FIG. 11. On the other hand, similarly to the embodiments in FIGS. 16 to 17, in the carry look-ahead generator CG18, the error detection system by doubling the circuits 1801 to 1806 is used, and also by utilizing the fact that this portion comprises a precharge circuit, a logic circuit of the structure which incorporates the diagnosis function of the error detection circuits EOR-1801 to EOR1803 is used. In the control circuit CTRL, the error detection by doubling the circuits 1807 to 1814 is used similar to the conventional case of FIG. 3, and further diagnosis circuits 1815 to 1818 are provided for the error detection circuits EOR1804 to EOR1807, respectively.

By selectively and combinedly utilizing these three kinds of error detection functions, the following advantages can be obtained.

(1) In the ALU unit including 1 and 3, the parity generation is done in parallel and the parity check is done utilizing the parity. Speed-up of the parity output and reduction in the circuit scale can be achieved in comparison to the conventional system of doubling the circuits.

(2) In the portion of the carry-look-ahead generator CG18, error detection by doubling the circuits is employed. By utilizing the nature of the precharge circuit and incorporating the diagnosis function of the error detection circuit, reduction in the number of circuits and speed-up of the error detection signal can be achieved.

(3) The portion of the control circuit CTRL should be constructed of static circuits due to the reasons that the control signal outputs should be held for two cycles or more. Also, the parity bit is not inputted to the control signal input terminal 80. Therefore, the error detection is done through a similar logic circuit structure as the conventional ones. However, the portions at which logic circuits of this structure are applied can be suppressed to the minimum. The ALU of this embodiment can attain speed-up and increase in the integration density as the whole ALU.

According to the present invention, the following advantages can be provided.

(1) The parity output can be obtained substantially at the same time as the data output of the operation circuit. For example, in the case of a 32-bits ALU embodying this invention, speed-up by about 20% can be attained. Further, 1-bit errors in the operations can be detected by the parity bits, allowing comparable reliability without doubling the circuits. Further, the area for the parity correction circuit and parity check circuit, etc. can be made smaller than that for one operation circuit. Therefore, the lay-out area can be made equivalent or less compared to the case of doubling the circuits.

(2) Further, when the present invention is widely applied to the whole operation unit, the number of circuits required for error detection can be reduced.

(3) When the error detection by doubling the circuits is co-used, the function of diagnosing the circuit for performing comparison and check can be incorporated into the dynamic logic circuit without degrading the high speed operability of th dynamic logic circuit.

Based on the above, speed-up and increase in the integration density of the operation unit having the error detection ability can be attained.

We claim:

1. A semiconductor integrated circuit device comprising a first logic circuit which performs in parallel with operations, generation of error detection codes and error detection of the operations, the first logic circuit comprising:

a first circuit train including a plurality of operation circuits, connected in series with one another, for receiving input data, performing predetermined operations while said input data propagates through said series-connected operation circuits and providing output data;

a second circuit train including a plurality of error detection code correction circuits, connected in series with one another, for receiving an error detection code input corresponding to said input data, applying corrections to the error detection code in correspondence to the operations in the operation circuits in said first circuit train, and outputting an error detection code corresponding to said output data; and at least one error detection circuit coupled to both the first and second circuit trains for performing comparison and check of the output of the operation circuit in the first circuit train and the output of a corresponding error detection code correction circuit in the second circuit train.

2. A semiconductor integrated circuit device according to claim 1, wherein said at least one error detection circuit includes one error detection circuit connected to the output of said first circuit train and another error detection circuit connected to the input of each operation circuit which does not propagate the parity error in said first circuit train.

3. A semiconductor integrated circuit device according to claim 1, further comprising a second logic circuit, the second logic circuit comprising:
doubled operation circuits having the same function as one another and receiving the same input signal as one another; and
a comparison circuit for comparing the outputs of said doubled operation circuits to each other.

4. A semiconductor integrated circuit device according to claim 3, wherein each of said doubled operation circuits comprises a logic circuit network for receiving input signal and performing logic operations thereon, a first switch circuit for pre-charging a parasitic capacitance at an interconnection in said logic circuit network, and a second switch circuit for deriving the output signal of said logic circuit network, the device further comprising a clock signal supply system divided into a supply sub-system for supplying the clock signal to said first switch circuit and another supply sub-system for supplying the clock signal to said second switch circuit.

5. A semiconductor integrated circuit device according to claim 4, comprising an ALU having an operation unit formed of said first logic circuit and a carry look-ahead generator unit formed of said second logic circuit and said clock signal supply system.

6. A semiconductor integrated circuit device according to claim 3, comprising an ALU having an operation unit formed of said first logic circuit and a carry look-ahead generator unit formed of said second logic circuit.

7. A semiconductor integrated circuit device according to claim 1, comprising an ALU having an operation unit formed of said first logic circuit.

8. A semiconductor integrated circuit device having a first logic circuit which comprises:
doubled operation circuits having the same function as one another and receiving the same input signal as one another;
a comparison circuit for comparing the outputs of the doubled operation circuits to each other; and
a clock signal supply system including a first sub-system for supplying a clock signal to first switch circuits coupled to logic circuit networks of said doubled operation circuits for deriving respective output signals from said logic circuit networks of said doubled operation circuits, and a second sub-system for supplying a clock signal to second switch circuits formed in said doubled operation circuits for precharging said logic circuit networks, thereby performing diagnosis of said comparison circuit at a predetermined time of diagnosis.

9. A semiconductor integrated circuit device according to claim 8, further comprising a second logic circuit which performs in parallel with operations, generation of error detection codes and error detection of the operations, the second logic circuit comprising:
a first circuit train including a series connection of plural stages of operation circuits for receiving input data, performing predetermined operations while said input data propagates through said operation circuits and providing output data;
a second circuit train including a series connection of plural stages of error detection code correction circuits for receiving error detection code input corresponding to said input data, applying corrections to the error detection code in correspondence to the operations in the operation circuits in said first circuit train, and outputting an error detection code corresponding to said output data; and
at least one error detection circuit for performing comparison and check of the output of the operation circuit in the first circuit train and the output of a corresponding error detection code correction circuit in the second circuit train.

10. A semiconductor integrated circuit device according to claim 9, comprising an ALU having a carry look-ahead generator unit formed of said first logic circuit and an operation unit formed of said second logic circuit.

11. A semiconductor integrated circuit device according to claim 8, wherein the supply of the clock signal to the respective operation circuits includes performing a logic operation upon reception of at least one input signal, connecting one end of the logic circuit network having a path between the two ends made conductive or non-conductive to a first power source, connecting one end of the first switch circuit to a second power source, connecting the other end of said logic circuit network and the other end of said first switch circuit to form a first node, connecting one end of a second switch circuit to said first node for deriving the signal at said first node, letting the other end of said second switch circuit be a second node, inserting a third switch circuit between said second node and said second power source, connecting a buffer circuit to said second node, supplying a first clock signal to a first and a third switch circuit in the operation circuit for outputting the signal at said second node through said buffer circuit, and supplying a second clock signal to the second switch circuit.

12. A semiconductor integrated circuit device according to claim 11, wherein said first, second, and third switch circuits, said logic circuit network and said buffer circuit are formed by using MOS FETs.

13. A semiconductor integrated circuit device according to claim 8, wherein the clock signals of said two sub-systems are formed from outputs of a clock generation circuit for generating clocks on the basis of an original clock signal inputted to the logic circuit and a control signal controlling the clock generation.

14. A semiconductor integrated circuit device according to claim 13, said clock generation circuit is formed on the same semiconductor chip on which is formed the logic circuit to which the output of said clock generation circuit is inputted.

15. A semiconductor integrated circuit device comprising a logic circuit which includes a plurality of operation circuits each including a first circuit for performing predetermined operation on input data and outputting output data, and a second circuit for performing predetermined operation on an error detection code input corresponding to said input data and outputting an error detection code corresponding to said output data, means for forming a data path by a first circuit train connecting said first circuits in the respective operation circuits, and means for forming an error detection code path by a second circuit train connecting said second circuits in the operation circuits which are connected mutually by said data path, wherein said logic circuit includes at least one error detection circuit for performing a check between the output data of said first circuit in the same operation circuit and the error detection code outputted from said second circuit.

16. A semiconductor integrated circuit device according to claim 15, comprising an ALU formed of said logic circuit.

17. A semiconductor integrated circuit device according to claim 16, wherein said operation circuit includes at least part of a latch circuit, a shift circuit and an adder/subtractor circuit.

18. A semiconductor integrated circuit device including an arithmetic logic unit, said arithmetic logic unit comprising:
- a data operation unit including a plurality of operation circuits, connected in series with one another, for receiving input data and for performing a predetermined arithmetic operation and/or a logic operation while said input data propagates sequentially through said plurality of operation circuits and providing for output data; and
- an error detection code generating unit including a plurality of error detection code correction circuits, connected in series with one another and respectively corresponding to said plurality of operation circuits, said error detection code generating unit applying a correction in correspondence to the operation of each of said operation circuits while an error detection code corresponding to said input data propagates sequentially through said plurality of error detection code correction circuits thereby to provide an error detection code corresponding to said output data,
wherein the generation of the error detection code by said plurality of error detection code correction circuits is performed in parallel with the operations by said plurality of operation circuits.

19. A device according to claim 18, wherein an error detection unit including at least an error detection circuit, said error detection circuit performing a comparison and check operation of an output of the last stage of said plurality of operation circuits and an output of the error detection code correction circuit corresponding to the operation circuit of said last stage.

20. A device according to claim 19, wherein when said data operation unit includes an operation circuit to which no error is propagated, said error detection unit performs the comparison and check of an output of the operation circuit which is the preceding stage of the operation circuit to which no error is propagated and an output of the error detection code correction circuit corresponding to the operation circuit.

21. A device according to claim 18, 19 or 20, further comprising:
- a carry look-ahead generator unit including:
  - doubled carry look-ahead generator circuits having the same function as one another and receiving the same input signal as one another; and
  - a comparison circuit for comparing outputs of said doubled carry look-ahead generator circuits to each other.

22. A device according to claim 21, wherein each of said doubled carry look-ahead generator circuits comprises a first logic circuit network for receiving an input signal and performing logic operations thereon, a first switch circuit for precharging a parasitic capacitance at an interconnection in said logic circuit network, and a second switch circuit for deriving an output signal from said logic circuit network, the device further comprising a clock signal supply system divided into a supply sub-system for supplying a clock signal to said first switch circuit and another supply sub-system for supplying a clock signal to said second switch circuit.

23. A device according to claim 22, further comprising a second logic circuit which performs, in parallel with operations of said operation circuits, generation of error detection codes and error detection of the operations, the second logic circuit comprising:
- a first circuit train including plural stages of said operation circuits connected in series with one another;
- a second circuit train including plural stages of said error detection code correction circuits connected in series with one another; and
- at least one error detection circuit for performing a comparison and check operation on the output of the operation circuits in the first circuit train and the output of a corresponding error detection code correction circuit in the second circuit train.

24. A device according to claim 22, wherein the supply of the clock signal to the respective operation circuits includes performing a logic operation upon reception of at least one input signal, connecting one end of the logic circuit network having a path between the two ends made conductive or non-conductive to a first power source, connecting one end of the first switch circuit to a second power source, connecting the other end of said logic circuit network and the other end of said first switch circuit to form a first node, connecting one end of a second switch circuit to said first node for deriving the signal at said first node, letting the other end of said second switch circuit be a second node, inserting a third switch circuit between said second node and said second power source, connecting a buffer circuit to said second node, supplying a first clock signal to a first and a third switch circuit in the operation circuit for outputting the signal at said second node through said buffer circuit, and supplying a second clock signal to the second switch circuit.

25. A device according to claim 24, wherein said first, second, and third switch circuits, said logic circuit network and said buffer circuit are formed by using MOSFETs.

26. A device according to claim 22, wherein the clock signals of said two sub-systems are formed from outputs of a clock generation circuit for generating clocks on the basis of an original clock signal inputted to the logic circuit and a control signal controlling the clock generation.

27. A semiconductor integrated circuit device according to claim 26, wherein said clock generation circuit is formed on the same semiconductor chip on which is formed the logic circuit to which the output of said clock generation circuit is inputted.

* * * * *